US010354386B1

(12) United States Patent
Farnsworth et al.

(10) Patent No.: US 10,354,386 B1
(45) Date of Patent: Jul. 16, 2019

(54) REMOTE SENSING OF STRUCTURE DAMAGE

(71) Applicant: United Services Automobile Association (USAA), San Antonio, TX (US)

(72) Inventors: Anthony Scott Farnsworth, San Antonio, TX (US); Teddy Joseph Edmond Voutour, Helotes, TX (US); Michael J. Allen, San Antonio, TX (US); Jordan A. Newmark, Fair Oaks Ranch, TX (US); Kathleen L. Swain, Kemah, TX (US); Jess W. Gingrich, San Antonio, TX (US); Anthony G. Castiglione, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 15/182,431

(22) Filed: Jun. 14, 2016

Related U.S. Application Data

(63) Continuation-in-part of application No. 15/008,043, filed on Jan. 27, 2016.

(51) Int. Cl.
*G06T 7/00* (2017.01)
*G06T 7/90* (2017.01)
*H04N 7/18* (2006.01)

(52) U.S. Cl.
CPC ........... *G06T 7/0085* (2013.01); *H04N 7/183* (2013.01); *G06T 2207/30184* (2013.01)

(58) Field of Classification Search
CPC .............................. G05D 1/00; G05D 1/0055
See application file for complete search history.

(56) References Cited

U.S. PATENT DOCUMENTS

| | | | |
|---|---|---|---|
| 8,346,578 B1 | 1/2013 | Hopkins, III et al. | |
| 8,760,285 B2 | 6/2014 | Billman et al. | |
| 8,872,818 B2 | 10/2014 | Freeman et al. | |
| 9,152,863 B1 * | 10/2015 | Grant | G06Q 40/08 |
| 9,463,875 B2 | 10/2016 | Abuelsaad et al. | |
| 9,684,834 B1 | 6/2017 | Ludwig et al. | |
| 9,832,751 B2 | 11/2017 | Robinson, Jr. | |
| 2003/0218540 A1 | 11/2003 | Cooper et al. | |
| 2008/0159591 A1 | 7/2008 | Ruedin | |
| 2008/0225132 A1 | 9/2008 | Inaguma | |
| 2009/0265193 A1 | 10/2009 | Collins et al. | |
| 2010/0026489 A1 | 2/2010 | Jordan et al. | |
| 2011/0130636 A1 | 6/2011 | Daniel et al. | |
| 2011/0310273 A1 | 12/2011 | Pien | |
| 2012/0120268 A1 | 5/2012 | Bockus et al. | |

(Continued)

OTHER PUBLICATIONS

U.S. Appl. No. 15/174,471: U.S. Non-Final Office Action dated Sep. 18, 2017, 19 pages.

*Primary Examiner* — Anshul Sood
(74) *Attorney, Agent, or Firm* — Baker & Hostetler LLP

(57) ABSTRACT

Unmanned vehicles can be terrestrial, aerial, nautical, or multi-mode. Unmanned vehicles may be used to survey a property in response to or in anticipation of damage to an object. Methods, systems, and devices may be used to determine damage information associated with structures (objects) in aerial images obtained by an unmanned vehicle, or other source. The damage information may include intensity of damage of a structure in an image.

20 Claims, 19 Drawing Sheets

(56) References Cited

U.S. PATENT DOCUMENTS

| | | | |
|---|---|---|---|
| 2012/0274440 A1 | 11/2012 | Meadows et al. | |
| 2013/0317865 A1 | 11/2013 | Tofte et al. | |
| 2014/0132409 A1 | 5/2014 | Billman et al. | |
| 2014/0368378 A1 | 12/2014 | Crain et al. | |
| 2015/0019267 A1 | 1/2015 | Prieto et al. | |
| 2015/0105933 A1 | 4/2015 | Martin et al. | |
| 2015/0170288 A1 | 6/2015 | Harton et al. | |
| 2015/0302029 A1* | 10/2015 | Miyashita | H04N 5/225 348/222.1 |
| 2015/0341535 A1 | 11/2015 | Forutanpour et al. | |
| 2015/0363717 A1 | 12/2015 | Lim | |
| 2016/0240087 A1 | 8/2016 | Kube et al. | |
| 2016/0282468 A1 | 9/2016 | Gruver et al. | |
| 2017/0286892 A1 | 10/2017 | Studnicka | |

* cited by examiner

REMOTE SENSING OF STRUCTURE DAMAGE

RELATED APPLICATIONS

This application is a continuation-in-part U.S. patent application Ser. No. 15/008,043, entitled "Systems and Methods for Unmanned Vehicle Management," filed Jan. 27, 2016. The contents of the above-referenced application are incorporated by reference herein in its entirety.

BACKGROUND OF THE INVENTION

Unmanned vehicles (e.g., unmanned aerial vehicles) are known for their use in combat zones. In combat zones, they are often used to surveille an area, damage a structures, or lethally wound a potential enemy combatant. The use of unmanned vehicles can go far beyond the aforementioned examples, especially outside of a combat zone and in a commercial setting. Businesses of all sorts are now developing innovative ways to use unmanned vehicles to benefit their business.

SUMMARY

Advancements in machine vision to classify objects, identify features, extract data, and drive automated decision regarding an object may be used to improve processes. Disclosed herein are methods, systems, and devices that provide insight into the damage intensity, damage indicators, damaged material, and the dimensions of damage area on a structure. In an example, measurements made on a 2D image may be augmented by using image context and external databases to estimate the height of features in structures. In another example, 2D estimations of linear distance and area may be used to determine 3D models to improve the estimation of material quantities needed for reconstruction of damaged objects. This information may be used after damage has occurred on a local or large scale event. Methods discussed herein may improve the triage process of locating material and contractor resources for reconstruction.

Unmanned vehicles may be terrestrial, aerial, nautical, or multi-mode. Unmanned vehicles may be used to survey a property in response to or in anticipation of damage to an object. In an example, an unmanned vehicle may have a camera take a picture of the object. Methods, systems, and devices may be used to determine damage information associated with structures (objects) in aerial images obtained by an unmanned vehicle, or other source. The damage information may be used to determine actions to assist individuals in need, may be used to trigger the unmanned vehicle to mitigate damages, or may be used to determine the magnitude of claims exposure after a major event, among other things.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Unmanned vehicles may be used to survey a property in response to or in anticipation of damage to the property. For example, an unmanned vehicle may analyze information about the property and based on the information determine the state (e.g., damage) of the property. This disclosure relates at least in part to identifying how unmanned vehicles may facilitate delivery of a service, such as claims processing.

Figure 1:
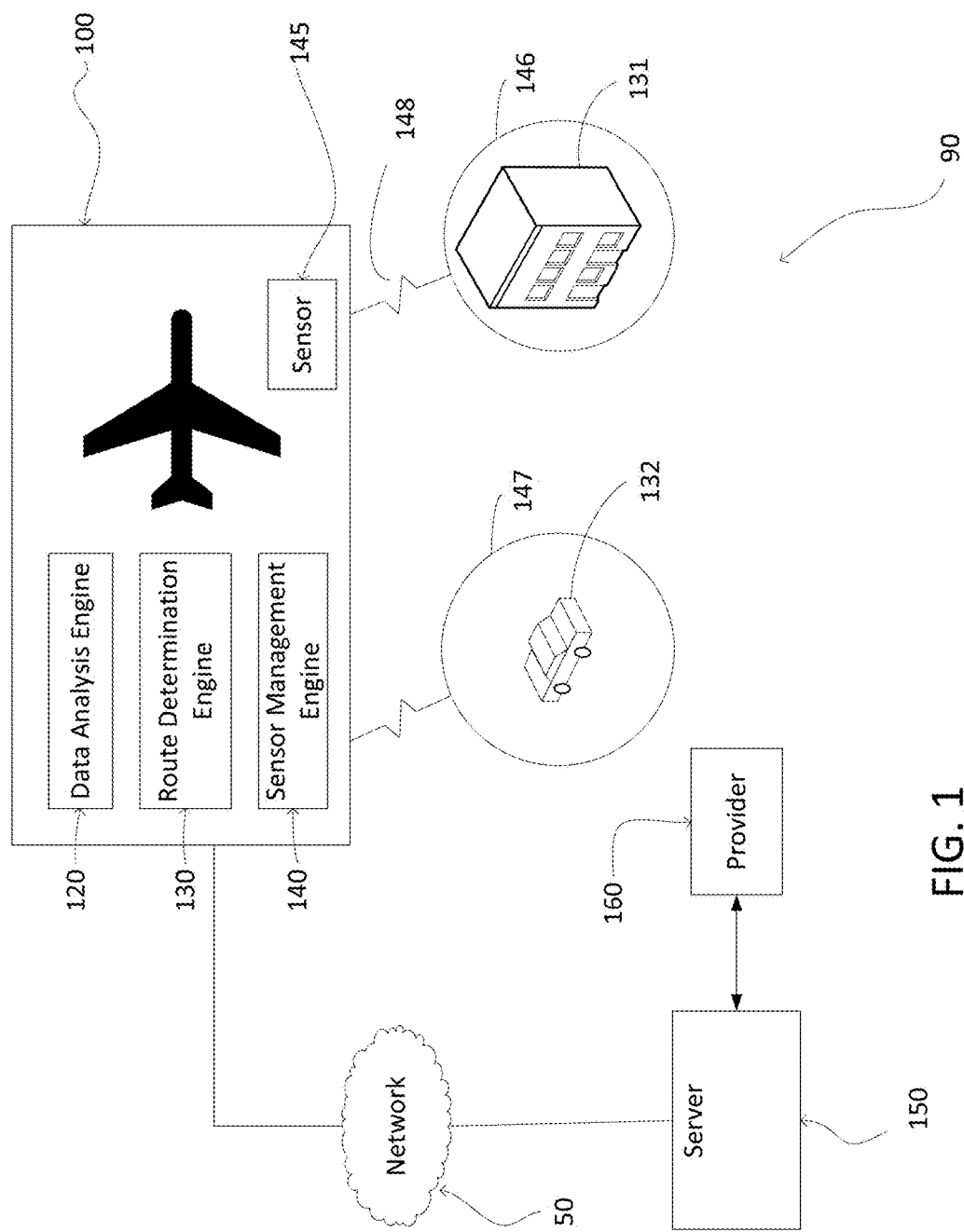
FIG. 1 illustrates an exemplary system associated with unmanned vehicle surveillance of a property.

FIG. 1 illustrates an exemplary system 90 associated with unmanned vehicle surveillance of a property. Unmanned vehicle 100 includes sensor 145, data analysis engine 120, route determination engine 130, and sensor management engine 140. Unmanned vehicle 100 may be communicatively connected with network 50 and server 150. A business (e.g., an insurance provider) may own or have control of unmanned vehicle 100, network 50, or server 150. Structure 131 (e.g., a commercial building or home) is located in area 146 and vehicle 132 (e.g., an automobile, motorcycle, or boat) is located in area 147.

Figure 19:
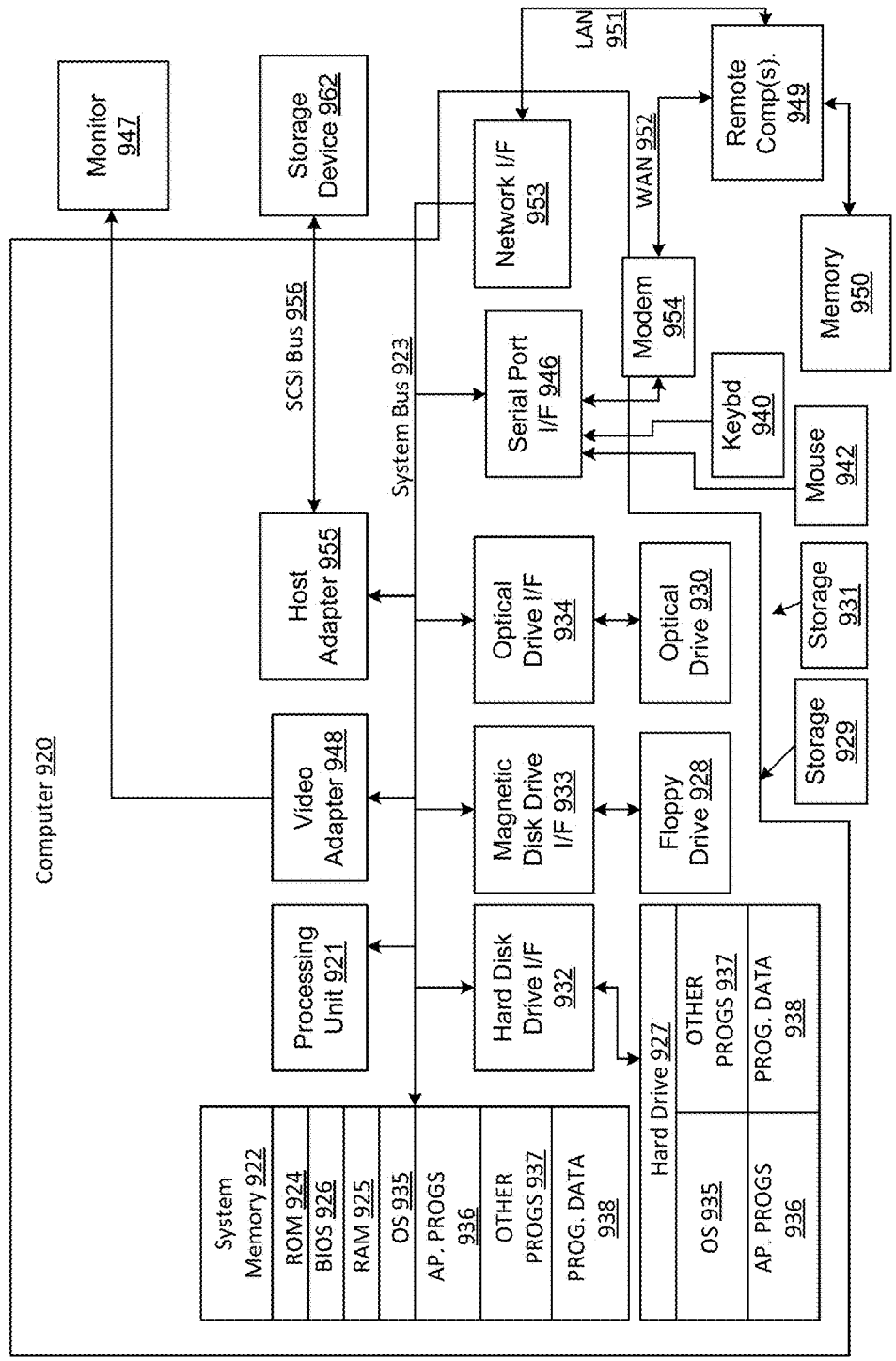
FIG. 19 is an exemplary block diagram representing a computer system in which aspects of the methods and systems disclosed herein or portions thereof may be incorporated.

With continued reference to FIG. 1, data analysis engine 120, route determination engine 130, and sensor management engine 140 are logical entities that may be implemented in the form of software (e.g., computer-executable instructions) stored in a memory of, and executing on a processor of unmanned vehicle 100, server 150, or another computer system such as illustrated in FIG. 19. Data analysis engine 120 may analyze data retrieved by sensor 145. Analysis by data analysis engine 120 may include comparing image data to stored coordinates to identify additional or replacement images that may need to be gathered. Route determination engine 130 may be utilized to manage unmanned vehicle 100, which may include confirming that unmanned vehicle 100 remains on a planned path based on a particular mission. Route determination engine 130 may also determine modifications to a route of unmanned vehicle 100 based on gathered data. For example, if additional images are needed of a certain location, which may include a different perspective or angle, route determination engine 130 may request unmanned vehicle 100 to vary the planned path accordingly, which may change the parameters of the mission.

Sensor management engine 140 controls sensor 145. This control may include determining which sensor of a plurality of sensors are gathering data, the operating characteristics of said data gathering (e.g., the level of zoom of a visible light camera), where sensor 145 is aimed, or any other sensor performance control variables as would be recognized by those skilled in the art. It is contemplated herein that sensor 145 may include a visible light camera, an infrared camera, a microphone, a particle inspection device (e.g., a device that can detect what compounds are in sampled air gathered by unmanned vehicle 100), radar emitting/detecting device(s), a spectrometer, a hyperspectral sensor, a temperature sensor, a humidity sensor, a gas sensor, or a navigation sensor, among other things.

Figure 2:
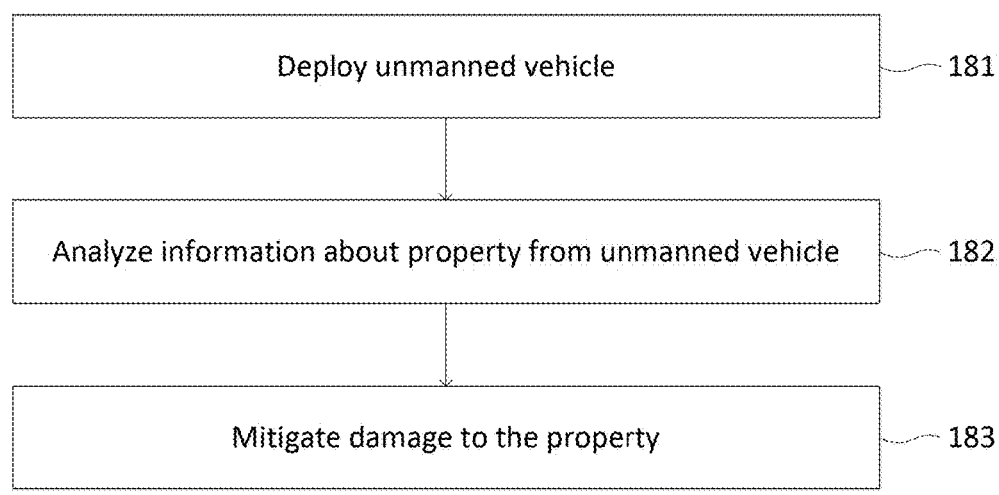
FIG. 2 illustrates an exemplary method to mitigate damage to a property with use of an unmanned vehicle.

FIG. 2 illustrates an exemplary method to mitigate damage to a property with use of an unmanned vehicle. At step 181, unmanned vehicle 100 may be deployed to a location (e.g., area 146). Unmanned vehicle 100 may be attached to structure 131 and deployed periodically to proactively survey structure 131 or other property in area 146. Deployment of unmanned vehicle 100 may be responsive to damage to structure 131. Unmanned vehicle 100 may be a shared resource for service providers (e.g., insurance providers) and may mitigate damage based on analysis of data received from sensor 145 (e.g., camera). Structure 131 may be a commercial building, smart home, or the like. Generally, a smart home may be considered a home equipped with lighting, heating, and electronic devices that can be controlled remotely by phone or computer. Multiple unmanned vehicles may be deployed based on the reason of deployment, specifications of an unmanned vehicle (e.g., range of unmanned vehicle), or consideration of information gathered after deployment (step 182). Unmanned vehicle 100 may release another unmanned vehicle (not shown) that may be smaller and be able go into restricted areas (e.g., inside a home). Unmanned vehicle 100 may have multiple sensors.

With continued reference to FIG. 2, at step 182, from unmanned vehicle 100, information may be gathered and analyzed about structure 131 (i.e., a property) or the travel path of unmanned vehicle 100, among other things. Information about the travel path of unmanned vehicle 100 may include steepness of terrain, power lines, or the like and may be marked on map or used in other way for future reference by the unmanned vehicle or an authorized user. Unmanned vehicle 100 is equipped with sensor 145 (e.g., a camera) that may be used to surveille area 146 or the travel path. Unmanned vehicle 100 may also use wireless or wired communication links to gather information from devices along the travel path (e.g., other unmanned vehicles along the travel path of vehicle 100) or devices of structure 131. Unmanned vehicle 100 may retrieve schematics of structure 131, previous images of structure 131 (or travel path) taken by unmanned vehicle 100 (e.g., for later comparison), or the like.

With continued reference to step 182 of FIG. 2, the data may be prioritized in the way it is gathered or analyzed. There may be an auction during flight before data gathering. There may be an auction after data gathering. As discussed before, service providers (e.g., insurance providers) may share the use of unmanned vehicles. An auction may be particularly useful or applicable when there are natural disasters (e.g., tornado, hurricane, fire) that may affect properties covered by multiple service providers. There also may be a subscription based model where members are presented with assessments based on the tier of their service plan.

At step 183, unmanned vehicle 100 may take actions to mitigate damage to the property based on analysis of the gathered information at step 182. In an example, mitigating damage may be to download, by unmanned vehicle 100, a backup copy of data of one or more devices at structure 131 before the devices of structure 131 are damaged. Downloading may occur via wireless connection 148 between unmanned vehicle 100 and structure 131 (hereinafter structure 131 includes any devices of structure 131). Downloading of data to unmanned vehicle 100 may occur for many reasons, such as used as back-up data connection due to errors or damage to an existing data connection of structure 131, or being a faster data connection between unmanned vehicle 100 and structure 131. In another example, unmanned vehicle 100 may connect to particular devices of structure 131, such as cameras, to determine extent of damage to structure 131, determine ways to mitigate damage to structure 131 that may be provided to police or fire departments, or download data for future assessment of insurance claims (e.g., data that assists in three dimensional imaging of area 146 during a disaster), among other things. In another example, mitigating damage may be shutting off gas lines or other devices that may cause additional damage if turned on.

With continued reference to step 183, mitigating damage may include placing, by unmanned vehicle 100, a substance or object onto structure 131 to deter damage. For instance a tarp may be put on structure 131 based on signs of a leak. In another example, mitigating damage may include determining a priority of sending an alert to a mobile device of a plurality of mobile devices based on the proximity of the mobile device to structure 131 or area 146 (e.g., area 146 is the site of a tornado). Unmanned vehicle 100 or server 150 may send the alert to the plurality of mobile devices based on the priority based on proximity of mobile devices.

Figure 3:
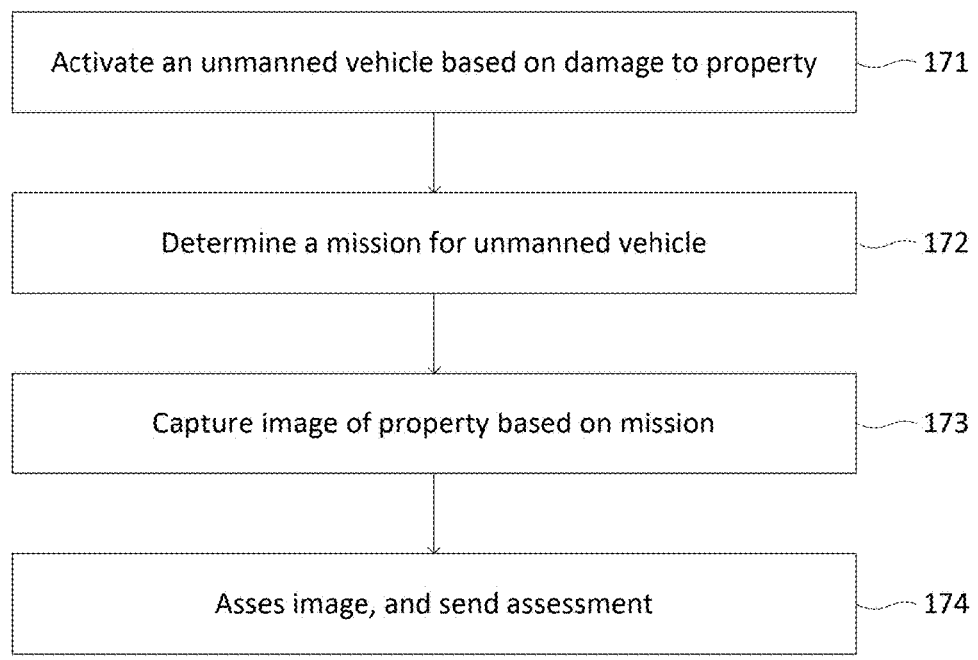
FIG. 3 illustrates an exemplary method for mission based image capture using an unmanned vehicle.

FIG. 3 illustrates an exemplary method for mission based image capture using unmanned vehicle 100. At step 171, unmanned vehicle 100 may be activated based on damage to a property. Property may include land, structures, vehicles, or other real or personal property. For example, vehicle 132 may have sensors that automatically communicate damage information, such a broken windshield or dented fender, as it occurs. Alternatively, an owner or other person may also call, e-mail, or otherwise communicate damage to vehicle 132. Communication may be done via wireless or wireline to server 150 or unmanned vehicle 100. Unmanned vehicle 100 may be situated at a remote location or attached to vehicle 132 and connected with computing systems of vehicle 132.

With continued reference to FIG. 3, at step 172, a mission is determined. A mission may be considered a plan of action for unmanned vehicle 132. The mission may be determined after taking several things into account, such as type of property or unmanned vehicle 100, type of damage, time, date, location of property or unmanned vehicle 100, weather, bodily injury, or service plan (e.g., insurance related) associated with property, among other things. In a first example, damage to vehicle 132 may have occurred in area 147 and there may be no indication of bodily injury to a person. The mission may be relatively simple, such as take picture of the damage and verify the identity of vehicle 132. The identity of vehicle 132 may be determined by taking a picture of the license plate or comparing the picture of vehicle 132 with expected type of vehicle. The identity or location of vehicle 132 may be done using GPS, image comparison, county records, or confirmation by owner or authorized user of vehicle 132, among other things. In a second example, damage to vehicle 132 may have occurred in area 147, but, in this example, bodily injury occurred. In the second example, the mission may be relatively complex in anticipation for the need to defend or support future claims. Tasks of the mission may include taking a high resolution image of the damage to vehicle 132, taking a high resolution image of the intersection or other vehicles in or around area 147, taking a high resolution image of the other driver that contributed to damage (if there are any), verify identity of driver or passengers of vehicle 132 (e.g., facial recognition or driver's license scan), or the like. Resolution as discussed herein in relation to images may be considered the number of pixels in an image. Resolution of an image is sometimes identified by the width and height of the image as well as the total number of pixels in the image. For example, an image that is 2048 pixels wide and 1536 pixels high (2048×1536) contains (multiply) 3,145,728 pixels (or 3.1 Megapixels).

At step 173, an image may be captured by a camera (sensor 145) attached to unmanned vehicle 100. The type of image captured or relayed to a remote server (e.g., server 150) may be based on the mission. With reference to the first example, unmanned vehicle 100 may arrive for a relatively simple mission that may include capturing an image of the damage by a sensor 145 (e.g., camera) of unmanned vehicle 100. Based on the mission, unmanned vehicle 100 may determine the need to minimize the size of the image to save storage capacity of a memory or maybe to transmit over a low bandwidth wireless communication link. The data size of the image (e.g., megabytes) may be minimized by providing instructions to the camera to capture the image with sensor 145 in a way that takes pictures with a minimum threshold resolution. This minimum threshold resolution may be needed to be able to assess area 147 or vehicle 132. A service provider (e.g., insurer) may not need details of the extent of damage (e.g., just desire confirmation that there was damage of a general scope), so a lower resolution image may be taken or stored. In an example, a lens or aperture of a camera (e.g., sensor 145) may be changed in order to manipulate the type or resolution of picture taken. Alternatively, the resolution of an image may be changed after the image is captured by sensor 145. In an example, an insurer may just desire to understand the damage to vehicle 132 without need for details on the extent of the damage. In another example, images may be taken of multiple angles of area 147 and vehicle 132 in order to do a three dimensional model for additional analysis later. In this instance, insurance claims, for example, may be proactively created based on the three dimensional representation.

Figure 4:
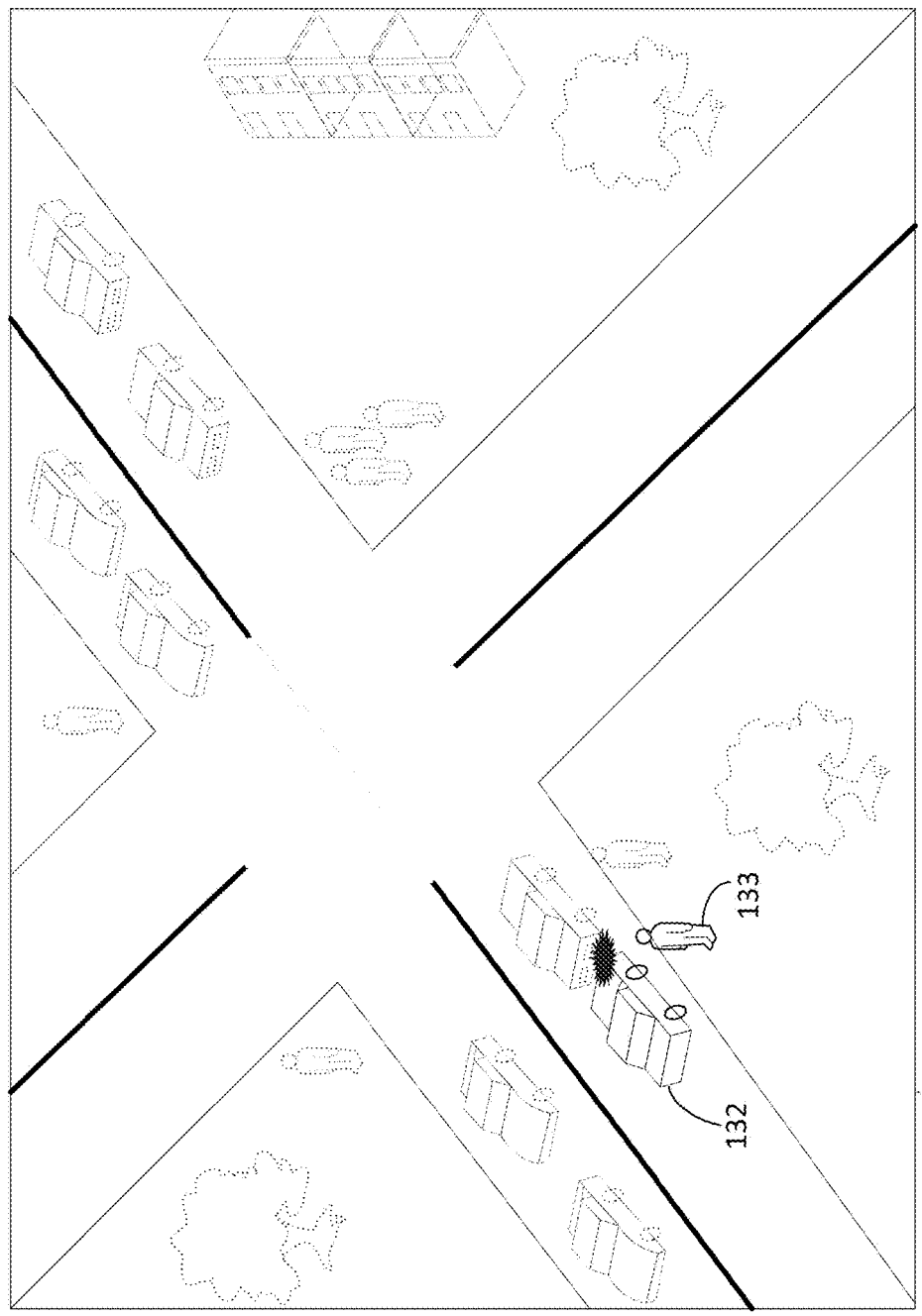
FIG. 4 illustrates an exemplary image taken by a sensor of an unmanned vehicle.

Manipulation of the resolution of an image may be used not only to address storage capacity of memory or bandwidth issues associated with a communication link of unmanned vehicle 100, but also to assist in addressing privacy concerns. In an example, damage to vehicle 132 may occur at a busy street corner (e.g., area 147), with many different vehicles, people, structures, and the like captured by sensor 145 (also sometimes referred to herein as captured by unmanned vehicle 100). As illustrated in exemplary image 134 of FIG. 4, damaged vehicle 132 and authorized user 133 of vehicle 132 may be at a higher resolution, than designated non-key portions, such as trees, structures, and other people in the image. Something may be considered non-key if it is minimally used in expected analysis (e.g., an insurance claim analysis) and non-key may be below a threshold of importance for the high resolution imagery of vehicle 132 and authorized user 133, but above a threshold that considers it not necessary. Level of importance for subsequent analysis may be on a similar scale (e.g., linear scale) compared to the resolution of the element (e.g., structure or person) within the image. For instance, there may be a need to have enough resolution to reasonably verify the location of vehicle 132 and understand the environment of area 147. Pixels may be blurred, if associated with trees, structures, and faces of people that are non-key. In alternative example, an image may be cropped to show just the property, which may save storage capacity, but also address privacy concerns of a persons in area 147.

With continued reference to FIG. 3, at step 174 the captured image may be assessed and the assessment may be sent to an authorized user. An authorized user may be the owner of vehicle 132, the owner of an insurance policy for vehicle 132, or the like. Damaged vehicle 132 may be compared to a previous image of vehicle 132, an image of a vehicle that is a similar make and model, or the like to determine the place and extent of damage. Other information may be used to make an insurance-based assessment of the damage (e.g., loss of value of vehicle 132 or cost in repairs). The other information for the assessment may include repair information of similarly damaged vehicles, "black box" information (e.g., speed of vehicle 132), or the like.

A mission may require a minimal threshold confidence level for a specific task, before vehicle 132 or area 147 is automatically assessed or unmanned vehicle 100 is allowed to depart area 147. The confidence level may be based on one or more of the following: number of images taken, a resolution of each image, resolution average of a percentage of images, or an image taken of vehicle 132 at a particular perspective. One or more of the aforementioned may help in meeting a minimum threshold confidence level of accuracy in subsequent analysis.

An assessment may be sent to the owner (e.g., an authorized user in area 147) via an electronic message. The electronic message may be a short message service (SMS) text message, an electronic mail (e-mail) message, multimedia message service (MMS) message, or other forms of electronic communication. An electronic message may include an image of the damage to vehicle 132 or an image of the vehicle 132, among other things.

Figure 5:
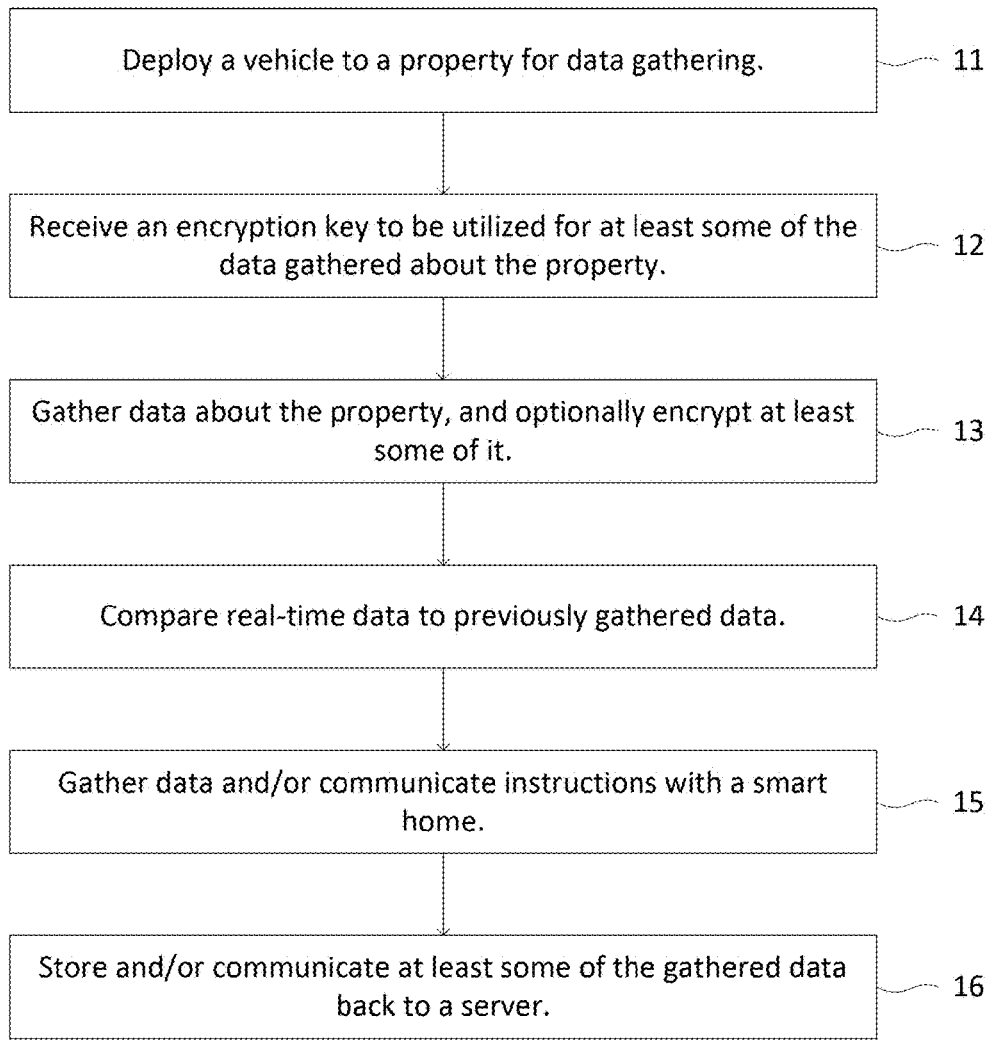
FIG. 5 illustrates an exemplary method associated delivering a service using an unmanned vehicle.

Turning now to FIG. 5, illustrated herein is a method 10 associated with managing an unmanned vehicle. At step 11, unmanned vehicle 100 is deployed to structure 131 (i.e., a property). This deployment may be in response to a notification that structure 131 has been damaged (e.g., structure 131 owner contacted his/her insurance company), or this deployment may be in response to an event that caused damage in and around structure 131 (e.g., a nearby tornado), or this deployment may be simply a periodic deployment to gather additional information. In an example, during a periodic deployment there may be an observation that there is a tarp on structure 131. This may be indicative of a service related event (e.g., insurance or roofer) and proactively contact a service provider or owner or operator of structure 131. Proactively contacting may be done via an electronic message to make an appointment to a service provider or reserve materials to repair damage to structure 131.

Next, at step 12, an encryption key may be received, such as at unmanned vehicle 100, and the encryption key may be utilized to encrypt at least some of the data gathered about structure 131, and at step 13, data about structure 131 may be gathered and optionally encrypted. For example, using the private key or public key encryption system exemplified by the RSA algorithm, either the public key or the private key (preferably, although not necessarily, the public key) may be sent to unmanned vehicle 100. In response, as unmanned vehicle 100 gathers data that pertains to structure 131 (e.g., an image that at least partly includes structure 131), unmanned vehicle 100 may encrypt that data. It is contemplated herein that the entire data (e.g., the entire image) may be encrypted as a result of the property being included in the data (e.g., image), and it is also contemplated herein that only the part of the data (e.g., image) that includes structure 131 may be encrypted. For example, the parts of the data not related to structure 131 may be cropped out of the data, thus leaving only property-related data to be encrypted.

Next, at step 14, previously gathered data (e.g., from a previous day/week/month/year) may optionally be compared to real-time gathered data. This comparison may enable the identification of a part of structure 131 that may be left. For example, if the real-time image discloses some rubble or one or more walls of a structure, the comparison to the previously-gathered image may reveal that the structure at that location has been partially or (almost) completely destroyed.

At step 15 of FIG. 5, communications between unmanned vehicle 100 and structure 131 (e.g., a smart home system may be executed). It is contemplated herein that structure 131 may include any type of electronic-based system that is involved with managing/monitoring/controlling a property. For example, structure 131 may monitor what appliances are being operated, what the conditions are (what rooms have movement, what temperature each room is), or actually controls aspects of the structure (e.g., if no one is home, reset the thermostat to a temperature that is less expensive to maintain). Further, although the terminology "smart home" is used herein, it is contemplated herein that the concept is applicable to any residential, commercial, or industrial property as would be recognized by those skilled in the art.

At step 16, data may be communicated back to a (central) server or a cloud service. For example, the vehicle may communicate via any available communication link (e.g., via a satellite link) back to server 150. In another example, unmanned vehicle 100 may leverage a communication link with structure 131 to send data to server 150. For example, unmanned vehicle 100 may send the data to structure 131, and structure 131 may utilize its own communication link (e.g., its own ISP (Internet Service Provider)) to forward the data along).

It is contemplated herein that the data gathered about structure 131 may be any data as described herein, and gathered from any of the sensors that are also described and referenced herein. Further, unmanned vehicle 100 may be enabled with functionality to analyze gathered data (e.g., an image) and determined whether the image sufficiently contains what is needed. For example, if unmanned vehicle 100 has been tasked with identifying the status of a residential home, and the vehicle gathers a visual image of the home from a relatively large distance (e.g., 1,000 feet), the image may be analyzed to determine that a closer or more zoomed-in image is needed to enable the functionality and analysis related to identifying what damage, if any, has occurred to the home.

Further, after the data is gathered, that data may be encrypted, stored, or shared according to various criteria. In one example, the vehicle may be deployed and instructed to gather information about a plurality of properties, such as vehicle 132 owned serviced (e.g., insured) by Company A and structure 131 service by Company B. In this example, each of those companies may purchase or be entitled to certain services related to operation of unmanned vehicle 100. For exemplary purposes only and without limitation, they may purchase an amount of data to be gathered and analyzed by unmanned vehicle 100, they may purchase an amount of storage space that the data relating to the company's properties may be stored in, or they may purchase an amount of communication bandwidth that the data relating to the company's properties may be communicated over. With respect to that last example, it is contemplated herein that the purchased bandwidth may relate to a total amount of data to be communicated (e.g., a total of 10 GB), an amount of real-time bandwidth (e.g., 5 Mb/second (this example is of five mega-bits (hence the lower-case "b") per second)), a total amount of data bandwidth per communication means (e.g., 2 GB per satellite link, 1 GB per smart home network daisy-chaining), an amount of real-time bandwidth per communication means (e.g., 1 Mb/second for a satellite link, 0.25 Mb/second for smart home network daisy-chaining), or any other communication limitations and management as may be contemplated by those skilled in the art.

Continuing with these examples with respect to purchased data storage space or purchased bandwidth, it is contemplated herein that gathered or encrypted data may be deleted if the available storage/communication means is insufficient (e.g., if there is no storage space left or there is a reduced amount of storage space, then that the remaining space cannot be allocated for the image based on the image's calculated expected value to the company as compared to the amount of storage/communication bandwidth left (e.g., if the image is only kind of valuable and revealing about the conditions of structure 131, and the limited amount of storage space/bandwidth is insufficient to justify keeping an image of such limited value)).

In another example, unmanned vehicle 100 may communicate with a computing device that manages, at least in part, structure 131 in area 146 (e.g., a smart home). It is contemplated herein that the communication link may be via Wi-Fi, Bluetooth, radio frequency, or the like as would be known and recognized by those skilled in the art. Continuing in part with the example above where two companies have tasked unmanned vehicle 100 to collect information about properties that the companies insure, for this example unmanned vehicle 100 may be communicating with vehicle 132 that is insured by Company A.

It is contemplated herein that Company A may enable communications between vehicle 132 and unmanned vehicle 100 by communicating to each that Company A authorized those two devices to communicate (secure) information. For example, Company A may supply unmanned vehicle 100 with a password/PIN that unmanned vehicle 100 can supply to vehicle 132 to tell vehicle 132 that unmanned vehicle 100 is authorized to learn about vehicle 132, and optionally even instruct vehicle 132 to perform certain actions, such as sending instruction to a device on or off a property to change the thermostat or turn off the water/gas/ electricity. In another example, Company A may communicate to vehicle 132 (e.g., via wireless connection) that unmanned vehicle 100 (which may be uniquely identified) is sent on Company A's request, and therefore vehicle 132 should communicate (fully) with it.

In another example, particularly sensitive data (e.g., an access code to a home's security system) may not be communicated, such as to a cloud computing data storage facility, and instead the data may be kept on unmanned vehicle 100 and only a reference to the sensitive data may be communicated and externally stored. Thus, this information has a reduced accessibility to potential hackers.

In another example, unmanned vehicle 100 may analyze data about a property (e.g., an image) to determine that additional data may be required. As a result, unmanned vehicle 100 may request a second unmanned vehicle (not shown) to gather the additional data. It is contemplated herein that the request may be communicated directly from unmanned vehicle 100 to the second unmanned vehicle, or it may be via unmanned vehicle 100 communicating that additional data is needed, and that request being forwarded to a second unmanned vehicle that has been identified as a result of the need for additional data.

In another example, unmanned vehicle 100 may identify a problem associated with the structure 131 and instruct structure 131 to address that problem. For example, unmanned vehicle 100 may identify that gas is leaking (e.g., via visual detection of a problem with a pipe, via detecting the gas in the air), and instruct structure 131 to shut off (e.g., an emergency shut off) the gas. Further, it is contemplated herein that this may also be applied to leaking water or any other problem that structure 131 may be leveraged to mitigate the possibility of additional damage being caused because of that. In another example, unmanned vehicle 100 may identify a problem associated with the structure 131 and forward the information to a remote server and the remote server may instruct structure 131 to address the problem. In another example, unmanned vehicle 100 may initiate a remedial action. A remedial action may be to initiate an insurance claim to address the damage to the property. Such a claim may be initiated by contacting provider 160 through network 50. In another example, unmanned vehicle 100 may be configured to initiate and adjust an insurance claim at area 146, 147 without contacting provider 160.

In one example, a third party operates, manages, or controls unmanned vehicle 100 or server 150, and distributes the data generated and developed therefrom to the one or more providers 160 that are associated with structure 131 to which the data or the subset(s) of the data relate.

In another example, providers 160 gather data and send the data to a pool, from which the data is culled and distributed to the one or more providers to whom the distributed data is pertinent or relates. The providers 160 may need to authenticate that they have a policy that covers structure 131 to which the data relates, or the providers 160 may need to authenticate that the location (e.g., GPS) of structure 131 (e.g., home) about which they are requesting information.

In another example, determination of which providers 160 are allowed to deploy vehicles 100 to an area may be at least partially based on the amount of area about which information needs to be gathered.

In another example, a first set of data is gathered (e.g., zoomed out optical imagery), and from that data it is analyzed and determined a priority of what property needs more data gathered therefrom (e.g., if damage is still occurring to structure 131, such as e.g., an active fire burning a part of the house) then gathering more data about structure 131's instant damage state may prove insignificant as structure 131 will likely end up being additionally damaged, and thus, structure 131 should be a low priority with regards to gathering additional data at this time.

In another example, tiers of data are collected, such as, for exemplary purposes only and without limitation, visual light image data, hyperspectral image data, infrared data. Said tiers may be handled, distributed, or analyzed alone or in combination.

In another example, unmanned vehicle 100 may take imagery that is analyzed to determine if structure 131 has sustained structural or roof damage. For example, the engines on unmanned vehicle 100 or engines on server 150 may analyze the data (e.g., image data) to determine if a roof at a certain coordinate has all of the corners and edges and whether said corners and edges of said roof appear to be damaged. In another example, the engines on unmanned vehicle 100 or engines on server 150 may analyze the data (e.g., image data) to determine the extent of damage that has occurred (e.g., the percentage of damage to a component (e.g., roof) of structure 131, the percentage of damage to an insured entity (e.g., vehicle 132), or the percentage of damage to an area 146 that may have multiple structures. In this or other examples, the engines on unmanned vehicle 100 or engines on server 150 may determine and identify which part of a structure 131 is damaged (e.g., roof, walls, windows, porch, or personal property).

In another example, unmanned vehicle 100 is deployed with data relevant to its mission (e.g., images from before the disaster and coordinates of insured's property), and such data may be utilized by unmanned vehicle 100 to determine how to manage or alter the mission.

In yet another example, data gathered by unmanned vehicle 100 may be compared or utilized in coordination with data gathered from other sources. For example, data may be utilized that is gathered from a "smart building" (a building, residential, commercial or industrial), such as via one or more sensors deployed on or near the smart building.

In another example, sensors 145 are utilized to detect if electrical lines are hot (e.g., temperature-wise or by virtue of current passing through them) or if there is a leak of a dangerous substance (e.g., natural gas).

Figure 6:
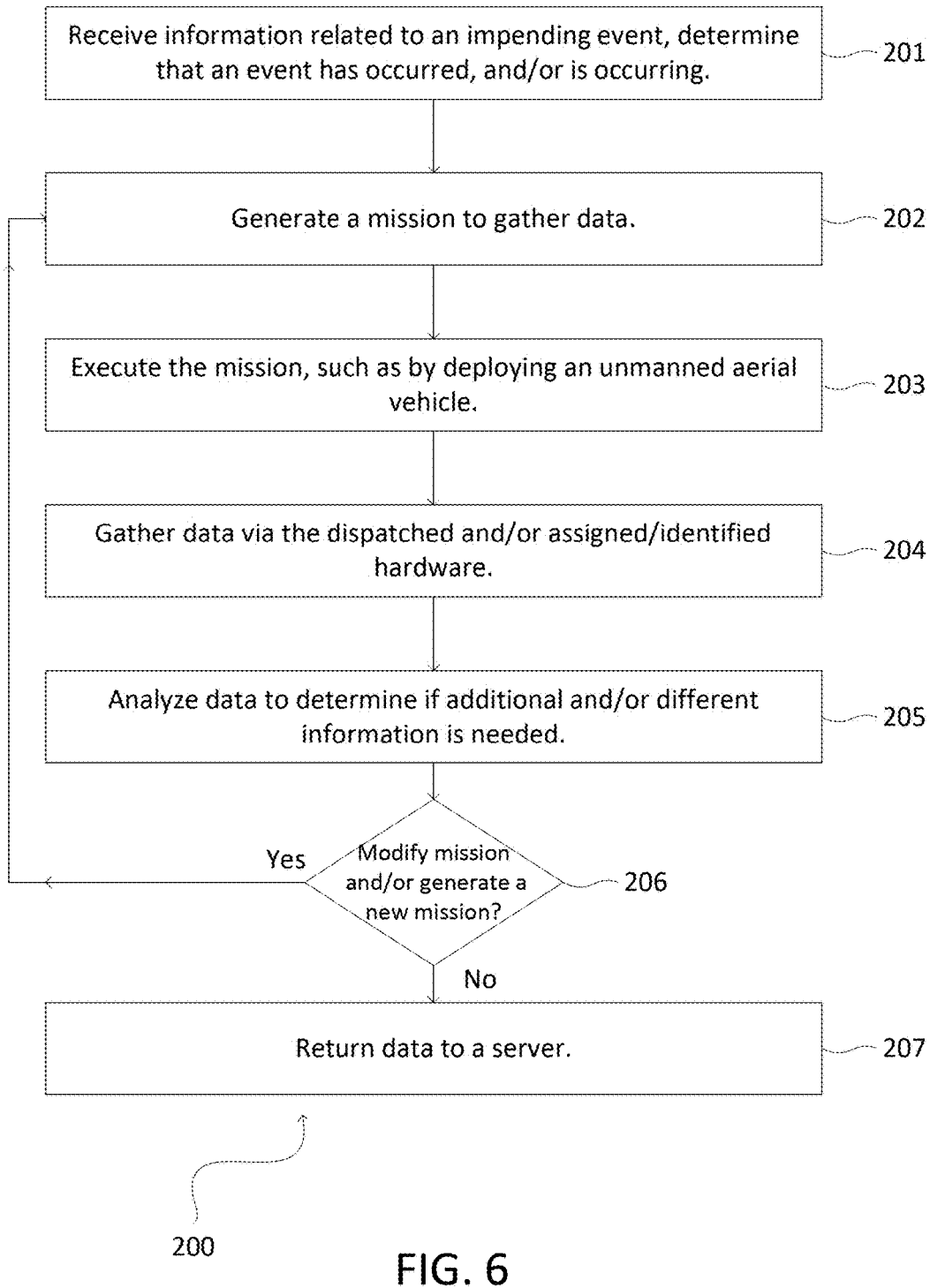
FIG. 6 illustrates an exemplary method for modifying an executing a mission of an unmanned vehicle.

FIG. 6 illustrates an exemplary method for modifying an executing a mission of an unmanned vehicle. At step 201, information is gathered that indicates that a mission should be generated. Such information may include that a local disaster has occurred (e.g., a tree fell on vehicle 132 that is owned by someone with an insurance policy with provider 160), that a medium-scale disaster has occurred (e.g., a fire that spread between several houses on a street, of which one or more of the houses may be insured, but are not necessarily insured, by provider 160), a wide-spread disaster will or may occur soon (e.g., a hurricane is forecast to hit an area, a forest fire may engulf an area, an earthquake is about to occur, a volcano is about to erupt), a wide-spread disaster is occurring (e.g., a hurricane is over an area of interest to provider 160, an earthquake is currently occurring, a volcano is currently erupting, a fire, be it forest or other, is currently damaging/destroying one or more homes), or a wide-spread disaster has occurred (e.g., any of the events described herein).

Generally speaking, the event identified by the information relates to damage that may occur to structure 131 which is insured by provider 160. However, it is contemplated herein that the event may be unrelated to homes or property (real or personal) that is insured by provider 160.

Subsequently, a mission is generated to gather data (step 202). This mission may include deploying (step 203) an unmanned aerial vehicle (e.g., vehicle 110), be it aerial, ground-based, or otherwise. It is further contemplated herein that the mission may include identifying any other devices (e.g., satellite) that may be utilized to gather the required data. Further, it is also contemplated herein that sensor 145 (which include a plurality of sensors) may be placed at or near the scene where a disaster has occurred or is expected to occur. For example, a sensor may be placed on or near an expected path for a hurricane. The placement may be via a drop from unmanned vehicle 100, an attachment to structure 131 (artificial or natural), or the like.

Data is gathered via sensor 145 on unmanned vehicle 100100 (step 204). This data may be gathered by aiming sensor 145 (e.g., cameras for visible light, cameras for other wave lengths), adjusting a zoom factor for sensor 145 (e.g., zooming the camera(s) in or out), coordinating an amount of time to gather data (e.g., continuously for digital imagery, length of exposure for still images, amount of air to be gathered to be tested according to a particulate sensor 145), or the like.

The data is then analyzed, such as by comparing the images to a map grid stored in unmanned vehicle 100, mapping the images to the map grid, determining that additional images are needed (e.g., a more detailed image or video), and indicating to unmanned vehicle 100 that said additional images are needed. It is contemplated herein that said analysis may be conducted via one or more engines on unmanned vehicle 100, via server 150 on the ground, via server 150 located in structure 131, or a combination thereof. Thus, it is contemplated herein that, while deployed, unmanned vehicle 100 may be in communication with server 150 via radio waves, via satellite communications, via WiFi, or the like.

In one example, providers may pay a fee for analysis of properties insured by providers to be analyzed on unmanned vehicle 100 rather than having to be analyzed via the ground systems. Not only would this allow for faster processing and utilization of the resultant analysis, but if network connectivity to the ground is absent or inconsistent, this would allow for the provider to position unmanned vehicle 100 to gather more useful information for the provider's properties. In another example, the flight path or the prioritization of what properties to image or process may be based on what type of disaster has occurred. At step 206, the existing mission may be modified or a new mission may be generated and executed. This decision may be based on data that is gathered (and the analysis thereof), new commands or requests sent to the vehicle 110, or combinations thereof. Alternatively, or in combination with analysis of the data, the data may be returned to server 150 (step 207).

Figure 7:
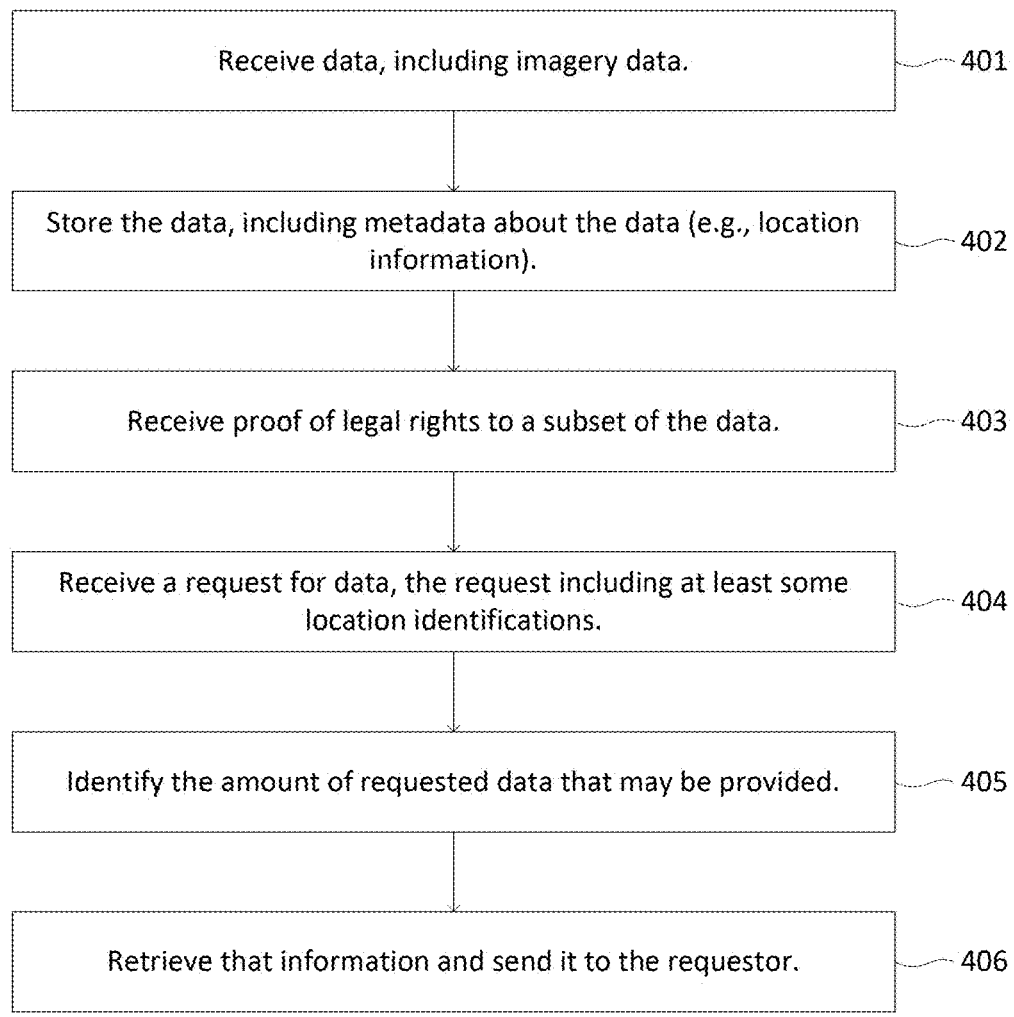
FIG. 7 illustrates an exemplary method for protecting surveillance data associated with an unmanned vehicle.

Turning now to FIG. 7, illustrated therein is an exemplary method protecting surveillance data associated with an unmanned vehicle. At step 401, data, such as image data, is received. The data may have been generated by sensor 145, and in one or more embodiments the data is stored with metadata that identifies what type of sensor gathered the data, the location (e.g., via GPS) of the vehicle that gathered the data, the location (e.g., via GPS and calculations dependent therefrom) of one or more objects in the image, or the day/time the data was gathered, stored, analyzed, or retrieved. At step 402, the data (and metadata) is stored. For example, every quantum of data (e.g., every pixel of an image) may have a location (e.g., a geographical location) associated with it.

At step 403, provider 160 (e.g., a service provider, such as an insurance company) supplies information that verifies provider 160 has legal rights to use at least a subset of the data. Legal rights may be verified based on geo specific data and policies in place by geolocation of unmanned vehicle 100.

At step 404, a request for data is received from provider 160. The step preferably includes at least some information identifying which data is being requested (e.g., the identifying information is location-centric). At step 405, in response to receiving the request, responsive data is identified. The responsive data preferably is consistent with the request of step 404 (e.g., the responsive data is of a certain type and from the location requested) and it is also confirmed that the requesting entity has legal rights to use the responsive data. For example, it is contemplated herein that the request may be for more data than the entity has yet proven they have a right to, so the responsive data identified and sent (step 406) is only the responsive data that the entity has a right to. The data disseminated can contain digital tracking software so that policy of the consumer is maintained and enforced for their data. Meaning, an organization may not be able to further disseminate the data to alternate end-users not defined in their policy based on location or other means. This can mitigate secondary 'selling' of data or subsequent use of the data not previously agreed upon and enforce privacy for private property that was the target of the acquisition.

Figure 8:
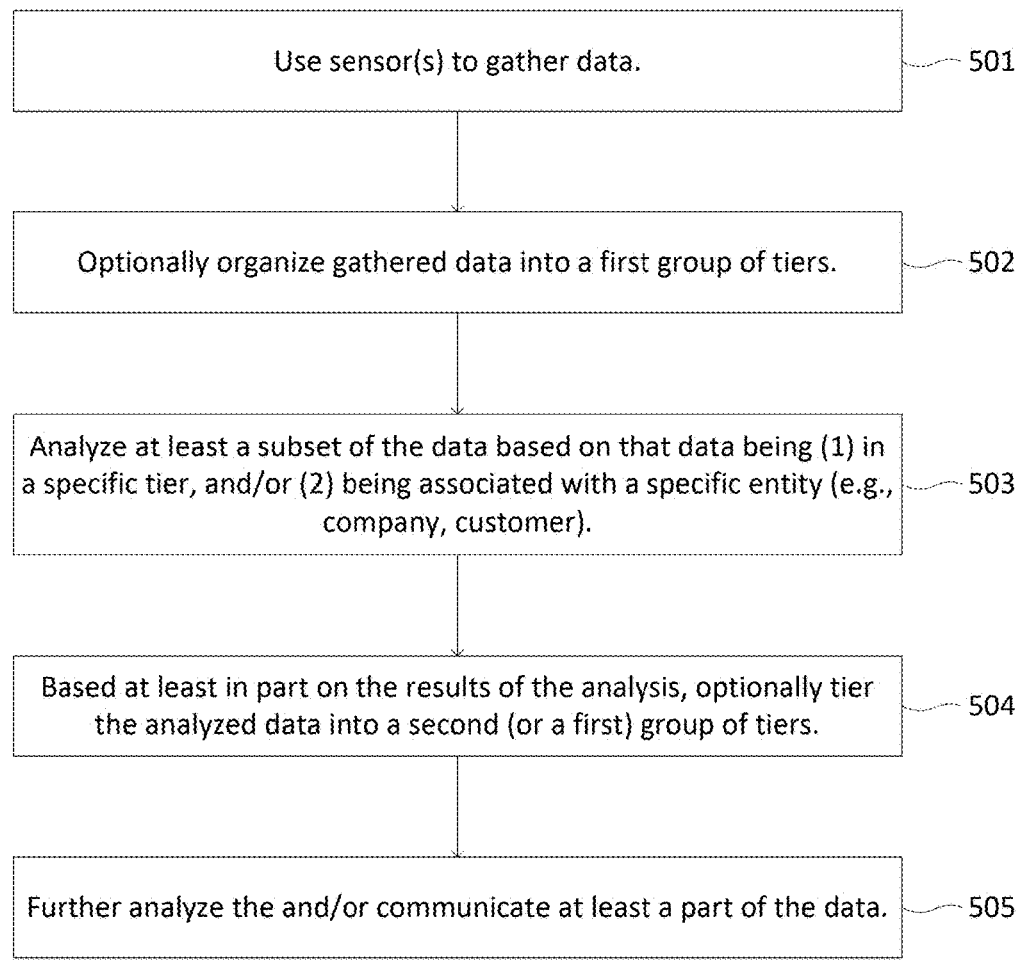
FIG. 8 illustrates an exemplary method for processing surveillance data associated with an unmanned vehicle.

FIG. 8 illustrates an exemplary method (method 500) of at least part of the data processing described herein. At step 501, data is gathered, and at step 502 data may be organized into a first group of tiers. At step 503, at least part of the gathered data, if not all of the gathered data, is analyzed. The selection of which data is to be analyzed, to the extent that only a subset of the data is analyzed, may be based at least in part on what tier that data is in or whether the data is associated with a specific provider 160 (e.g., the data represents a structure that may be insured by an insurance company). At step 504, the data may be tiered, and finally the data may be analyzed again based on the tiering, or the data may be communicated to a party (e.g., the aforementioned "entity"). It is contemplated herein that the tiering of the data may result in varied analysis. For example, different type of analysis, different level of detail for the analysis, different priority (e.g., timing) of the analysis, or the like. It is contemplated herein that the analysis may include converting image data into a textual representation of at least some of that data, detecting whether power lines are active (e.g., via thermal imaging, via magnetic field detection), detecting whether a gas line is broken (e.g., via thermal imaging to detect a leaking gas of a different temperature than the background, via analysis of the gas(es) in the air), or the like. Such analysis may be utilized to predict (and send appropriate warnings) regarding possible future damages or accidents that may be caused by one or more of these conditions (e.g., step 505).

With continued consideration of the warnings that may be sent, a warning may be an electronic message sent to a mobile device or computer. The electronic message may be e-mail, SMS, MMS, or the like. It may include a map (or link to a map) or other message that may display something to the effect that "this is how close your property was to the flood waters" or "your vehicle (vehicle 132) is approaching an intersection that has had [X type of] collisions based on [Y type variables]." The X type of collisions may be frontal, side collisions, or the like. The Y type of variables may be variables such as, driving at a certain speed or inappropriate lane changes. The electronic message may include suggested updates to a policy owner's policy based on the gathered information or suggested proactive measures a policy owner may take to reduce damage during, before, or after an event that may cause damage to property. For example, conventionally, a first house on fire will not necessarily trigger an alarm of a second house (e.g., neighbor's house). An electronic message may be sent to the second house to turn on sprinklers, shutoff gas, alert those residing in the home, or the like. The electronic message may be sent to turn on a siren alert to wake up individuals in the second house. Also the sent electronic message from unmanned vehicle 100 may include a map or instructions for safely exiting structure 131 or area 146 based on latest imaging and other gathered information. In another example, an unmanned vehicle may use the communication system of structure 131, vehicle 132, or a mobile device (not shown) of a user to communicate to other entities. Unmanned vehicle 100 may use the communication system (e.g., data connection) of structure 131 to communicate with a remote server (e.g., server 150) for additional processing of captured data from area 146. Unmanned vehicle 100 may use a mobile device of a user to call a police department, fire department, or the like. This use of other communication links of another device (e.g., via Bluetooth) may reduce costs for an operator or owner of unmanned vehicle 100.

Herein are several different examples associated with unmanned vehicle service delivery. It is contemplated herein that methods, components, or the like of each example may be reasonably integrated with or removed from other examples discussed herein. Additional examples are discussed below.

In one example, a buffer zone is established to keep unmanned vehicle 100 away from identified locations. Such locations may be homes of insured properties covered by provider 160, anyone's home, people that may have been identified in an image, trees, physical impediments, smoke, or other possible interfering conditions. The buffer zone distance may be a predetermined distance that is set before the mission is generated, when the mission is generated, communicated to unmanned vehicle 100 during the mission, or generated by unmanned vehicle 100 in response to data analysis performed during the mission.

In an example, unmanned vehicle 100 is deployed before an event occurs, such as a widespread disaster, in order to facilitate identification of what damage has been caused by the event and what damage was pre-existing.

In an example, unmanned vehicle 100 sends data to server 150 and server 150 deletes sensitive data (e.g., images of people). It is further contemplated herein that server 150 may act in coordination with a plurality of providers 160, and server 150 may forward on to each provider 160 data that is associated with an insurance claim that has been or may be made against a policy associated with that provider. In this exemplary embodiment, a single entity (e.g., a neutral party or a government affiliated party) organizes or is involved in the deployment of unmanned vehicle 100, and provider 160 interacts with that single entity to obtain information to which provider 160 is entitled.

In an example, unmanned vehicle 100 may take images of individual pieces of property (e.g., structure 131 at area 146 or vehicle 132 at area 147), and the individual images may be sent to the provider that has an insurance policy covering that piece of property (and where no provider covers that property, said image may be deleted). In another example, unmanned vehicle 100 may take a single image that includes multiple pieces of property. This single image may be sub-divided into sub-components, each of which is exclusive. In a first scenario, it may be a single provider. For example, the image may include a plurality of properties but each of which is associated with the same provider. Or in a second scenario it may be in relation to a single piece of property, either in whole or in part. In other words in the aforementioned second scenario, the image may be entirely of a single property (e.g., structure 131) or it may be a portion of the single property (e.g., a wall of structure 131).

In an example, unmanned vehicle 100 uploads data instantaneously (or nearly so).

In another example, unmanned vehicle 100 analyzes all or some of the data before uploading it to server 150.

In another example, unmanned vehicle 100 may be equipped with a surplus of sensors 145, of which only some may be utilized on a given mission. In another example, unmanned vehicle 100 is dynamically equipped with sensors 145 based on the parameters of the mission. In another embodiment or use case, the types of sensors 145 selected are determined at least partially based on the type of event that has occurred (e.g., if the event is a flood from a river, then sensors 145 that gather hyperspectral imagery may not be included on unmanned vehicle 100).

In another example, data is streamed via LTE, Wi-Fi, or any networking means as would be recognized by those skilled in the art. In another example, data is streamed via one or more unmanned vehicles 100 communicating or relaying information to a communication station for one another.

In another example, a plurality of unmanned vehicles 100 may be assigned to a single airspace that is related to or is over the site of an event such as a widespread disaster.

In another example, a plurality of unmanned vehicles 100 are assigned to a plurality of airspaces that may be assigned, and said airspaces may be exclusive of each other (or they may not be exclusive of each other). It is contemplated herein that airspaces may be exclusive of each other via geographical coordinates (e.g., the x-axis or the y-axis) or via altitude (e.g., the z-axis).

In another example, the engines related to specific flight and safety control of unmanned vehicle 100 may be separate from the engines that analyze the data (e.g., data analysis engine 120, route determination engine 130, sensor management engine 140).

In another example, unmanned vehicle 100 may receive a request for data, and unmanned vehicle 100 may alter a flight path to gather the requested data, unmanned vehicle 100 may confirm the gathered data matches the requirements of the request, and then communicate the requested data (such as to the requesting party).

In another example, hyperspectral imagery is taken, utilized, and analyzed to determine information such as what kind of damage was sustained. For example, the engines on unmanned vehicle 100 or engines on server 150 may determine whether water damage was caused by salt water or fresh water. The type of water damage may be utilized to determine if an insurance claim should be characterized as flood or storm damage or the extent of damage, such as damage to carpet, wood flooring, or the like.

In another example, a mission or plurality of missions may be analyzed to determine what sensor(s) 145 should be installed on unmanned vehicle 100 for a future missions.

In another example, there is an order of deployment for unmanned vehicles 100, such as, first fixed wing craft, then multi-rotor, or ground vehicle(s).

In another example, unmanned vehicle 100 determines and relays or saves the location of another unmanned vehicle (not shown).

In another example, a request message is sent to an insured to ask permission for unmanned vehicle 100 to deploy at or near property owned by the insured so as to enable or facilitate unmanned vehicle 100 to gather data about a property (e.g., structure 131 or vehicle 132) of the insured.

In another example, unmanned vehicle 100 includes artificial intelligence (AI) that performs risk analysis and which may be used to determine a planned path of unmanned vehicle 100 for a mission.

In another example, unmanned vehicle 100 may be utilized to monitor a property, such as after vehicle 132 has been stolen.

In another example, unmanned vehicle 100 may provide cell phone or satellite phone uplink. Also unmanned vehicle 100 may operate as a repeater for a mobile phone or satellite data or voice. It is contemplated herein that multiple unmanned vehicles 100 may be daisy chained together to provide communication service to mobile phones, among other things. Unmanned vehicle 100 may provide network connectivity, such as cell phone tower (e.g., by imitating a cell phone tower) or a Wi-Fi base station.

In another example, unmanned vehicle 100 may include video streaming functionality. For example, if a claim is initiated by or on behalf of an insured, an unmanned vehicle 100 may be deployed to the insured and the insured may utilize unmanned vehicle 100 to perform video or audio communications with provider 150 or representatives associated therewith.

In another example, unmanned vehicle 100 may provide a mobile ATM that dispenses money to an authorized user.

In another example, unmanned vehicle 100 may be a parent unmanned vehicle 100 that has multiple child unmanned vehicles that may dock with or be partially or completely controlled by parent unmanned vehicle 100. Parent unmanned vehicle 100 may provide messages to child unmanned vehicles and may also be released from parent unmanned vehicle 100 to help provide a communication link to network 50 (e.g., a daisy chain link as discussed herein).

In another example, a damage model, such as a tornado-damage model, may be utilized to determine which areas around a tornado's path should be analyzed for possible damage, and therefore which areas to which unmanned vehicle 100 should be deployed.

In another example, unmanned vehicle 100 may detect structure 131 (e.g., a house) has been completely destroyed and initiate the claims processing for the owner of structure 131. Unmanned vehicle 100 may send a message that may include an image related structure 131. The message may provide an estimated repair time and image of structure 131 through a timeline of repair. There may be an generated image of what structure 131 should look like at the beginning of each week, for example. This may give the owner of structure 131 peace of mind of knowing their property will be as good as new within a provided time frame and reduce calls for additional info during or after an individual accident, widespread disaster, or the like.

In another example, unmanned vehicle 100 may gather thermal imagery, which may be utilized to identify hail (or other) damage to a home's roof.

In another example, unmanned vehicle 100 may be utilized for fraud detection. For example, if an insured reports that the insured's car's bumper has been fixed, one or more unmanned vehicles 100 may be sent to determine whether said repair actually was performed.

In another example, data gathered from unmanned vehicle(s) 100 may be utilized to prevent or inform new policy enrollment decisions (e.g., "you can't get fire insurance now because the forest fire is next door").

In another example, data gathered from unmanned vehicle(s) 100 may be utilized to for targeted marketing of non-impacted homes (e.g., "your neighbor had flood damage, so you should consider getting flood insurance"). There may be an e-mail from unmanned vehicle 100 to neighbor. There may be an email to customer with specific information to refer their neighbor that resides at a particular address.

In another example, unmanned vehicle 100 could be deployed to an insured or a prospective insured's location or property to conduct, obtain or retrieve the necessary medical tests or samples (such as for enrollment, configuration, adjustment of health or life insurance policies).

In another example, unmanned vehicle 100 may be utilized to generate models that predict how much damage is expected around a certain range of an event. For example, a tornado with speeds of 85 mph, at 250 yards the damage is expected to be total destruction, up to 500 yards the damage is moderate to heavy, etc.

In another example, unmanned vehicle 100 may utilized monitor on-site damage to property (e.g., a corner of a building was damaged), detect that vegetation needs to be watered (e.g., to reduce chance of catching on fire), or take pictures using sensor 145 of a gathering such as a company party.

In another example, a customer may sign up for a service that includes the customer's associated provider 160 monitoring structure 131 identified by the customer. For example, the customer may request an update from provider 160 if new data is gathered (e.g., new images from unmanned vehicle 100). In another example, the customer may request an update if analysis based on new data identifies one or more predetermined situations (e.g., that the amount of flammable brush within a predetermined distance to the customer's home has exceeded a threshold). In another example, the customer may request provider 160 to monitor structure 131 because the customer is not at structure 131, in which case the customer may request that any detected changes result in an alert to the customer as well as a third party (e.g., the police).

Figure 9:
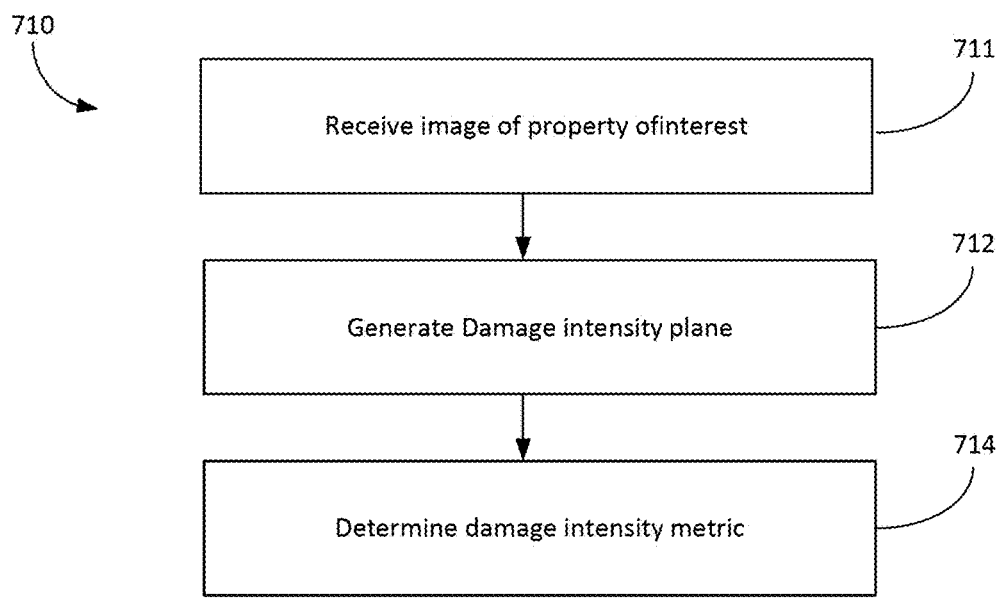
FIG. 9 illustrates an exemplary method that may be used to assist in image processing associated with damage detection.
Figure 10:
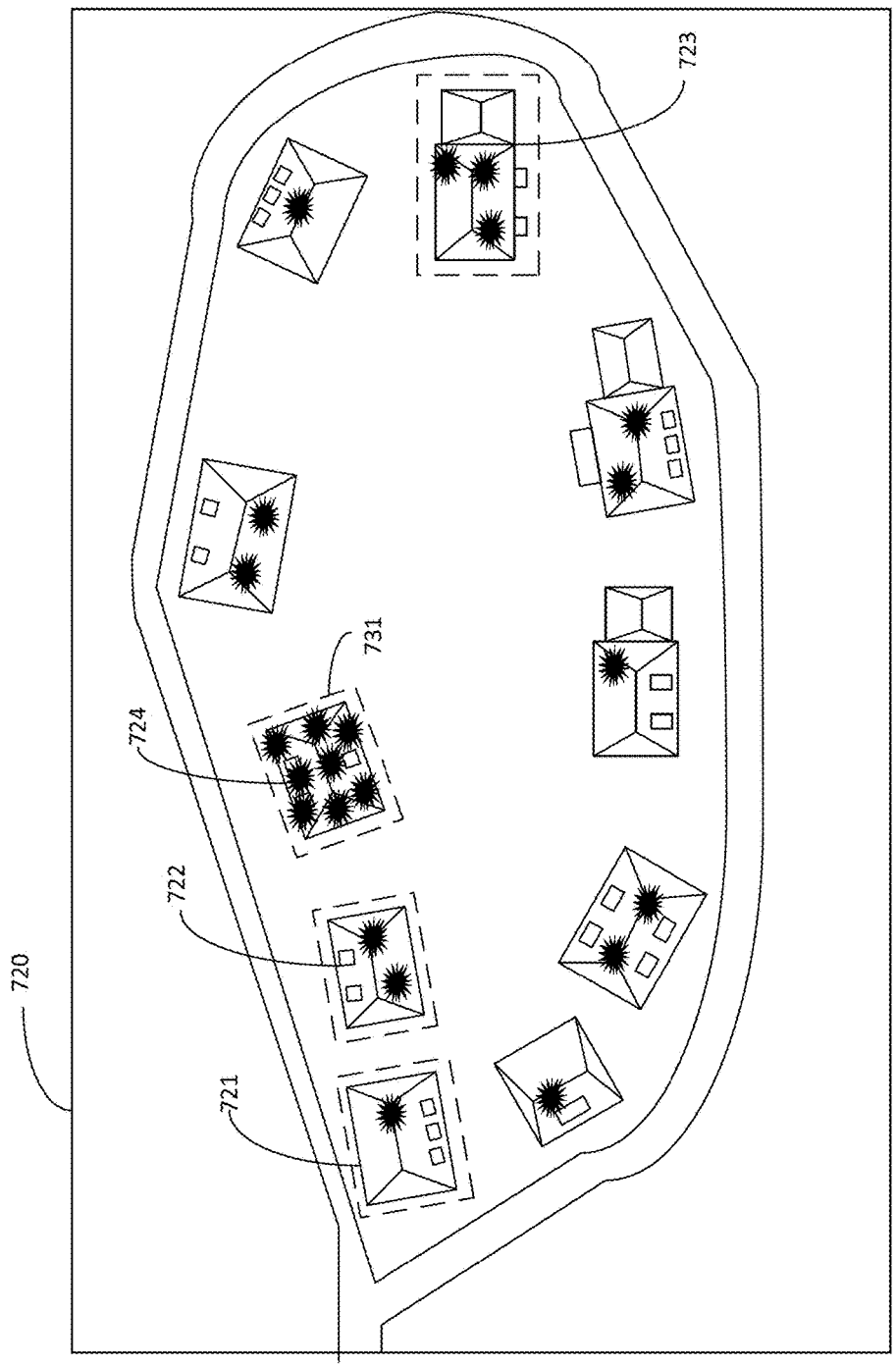
FIG. 10 illustrates an exemplary image with homes.

As discussed herein, imaging techniques may be utilized to identify damage to structures, such as a roof or wall of a home. Discussed below are more details with regard to remote sensing of structure damage intensity, damage indicators, and damage dimensions, among other things. FIG. 9 illustrates an exemplary method 710 that may be used to assist in image processing associated with damage detection. At step 711, image 720 of FIG. 10 may be received. Image 720 may include one or more structures (e.g., homes), such as home 721, home 722, home 723, or home 724. Image 720 shows an aerial perspective of a subdivision that contains a plurality of homes. Image 720 may be a picture taken by sensor 145 (e.g., a camera) of unmanned vehicle 100. Preferably the location of sensor 145 at the time of the picture is taken is known. The location may be determined by the use of GPS of unmanned vehicle 100, a cross-reference to a geographic location service, or location meta-data included with image 720, among other things. Geographical location information may assist in determining whether a property is a property of interest to apply subsequent operations within this method 710 or one or more steps of other methods, such as method 740, method 750, or method 760.

Figure 11:
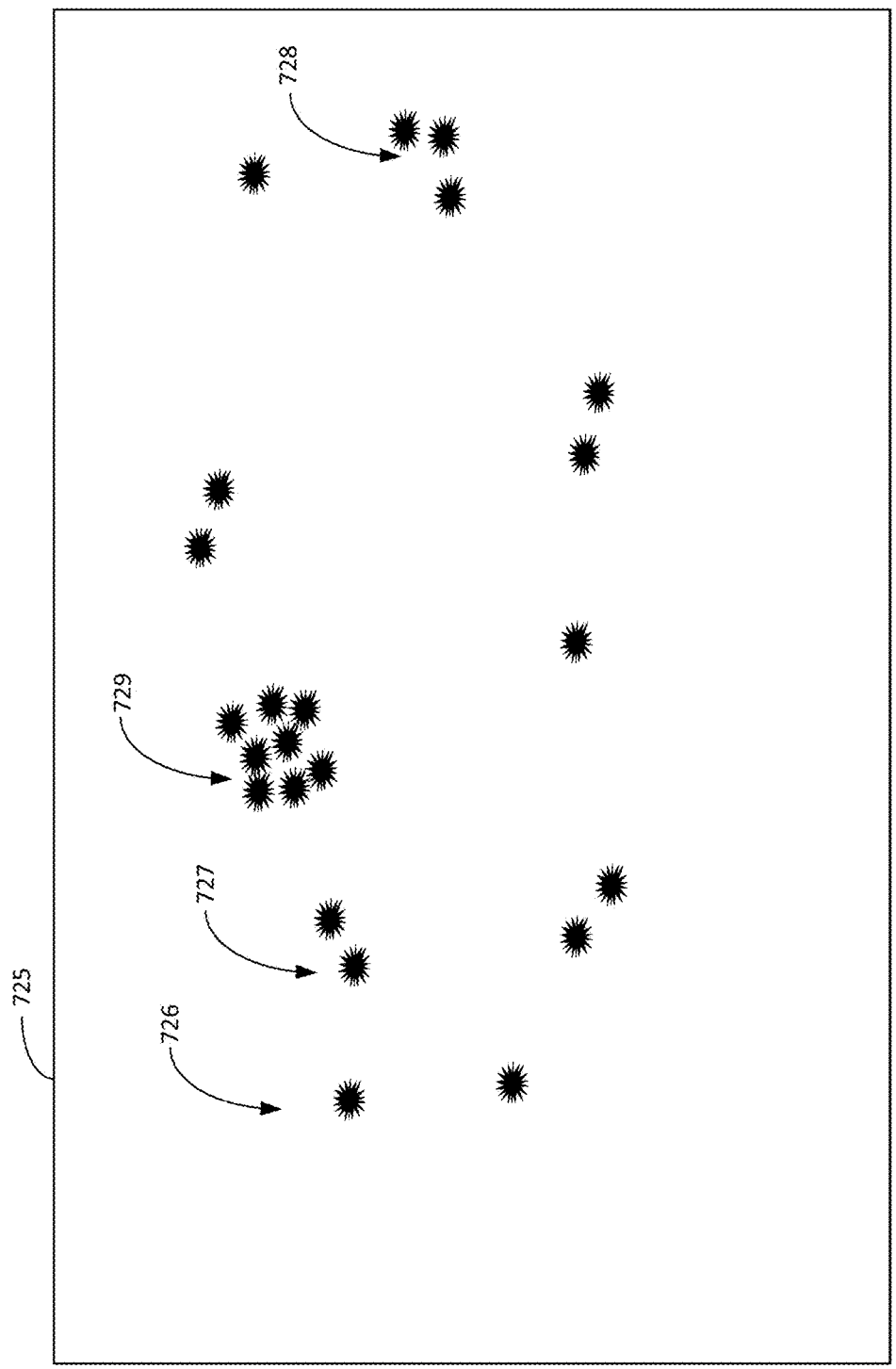
FIG. 11 illustrates an exemplary damage intensity plane image.

With continued reference to FIG. 9, at step 712, the pixel information of image 720 may be used to create a damage intensity plane. Damage intensity plane may be considered an indication of intensity of damage across a selected area. For example a damage intensity plane may include values of pixels of the selected area, in which the values may be created by imaging techniques as discussed herein. The damage intensity plane may be visualized into an image as shown in FIG. 11.

The damage intensity plane may be created by converting image 720 to a pixel matrix, then applying mathematical operators to the matrix to extract properties from the matrix information. For example, pixels of image 720 may be assigned a value (e.g., if RGB color model between 0-255). During digital image processing each pixel may be represented in computer memory or interface hardware (for example, a graphics card) as binary values for the red, green, and blue color components in a RGB color model. The gradient of the rows and columns are analyzed and when the gradient is of a certain level then it can be determined to be an edge. If there are several edges within the boundaries of a property then that may be an indication that there is something that is not typical about a piece of property (e.g., roof).

The anticipated damage type may also be fed into step 712 to determine the appropriate image processing. A particular damage type, such as hail damage or shingle removal of a roof, may show up well using a particular sequence of image processing steps (including image matrix transform operators). In other words, there may be many types of image processing routines that may be applied to an image. The sequence and use of particular image processing techniques may be a function of the anticipated damage type in order to maximize the accuracy of the detection of damage. In an example, the anticipated damage type may be determined based on damage typical of a damage causing scenario, such as tornado, hail, flood, wind, fire, or the like. Determination of the anticipated damage type (s)—and subsequent sequence and use of image processing techniques—may be based on receiving an indication of the damage causing scenario. For example, for hail detection, a raw image may be placed through image processing steps, such as 1) extract hue, saturation, luminance (HSL), 2) lookup table to compare and equalize HSL based on historical information, 3) smoothing based on averaging information of image, etc.

With continued reference to step 712, image processing techniques to help determine damage may be associated with one or more of the following techniques: filtering, edge detection (e.g. sobel operator, prewitt operator), image hue, saturation, intensity, color, etc. thresholding, or binary image morphology. Image processing techniques to help determine damage include information associated with trained machine learning engines, image classification algorithms, multi class classification, and anomaly detection. The aforementioned techniques may be used to correlate particular types and levels of damage or material properties when a threshold is reached. Filtering and transform operators may enhance the image features indicative of damage. Thresholds applied to enhanced pixel values may help to classify regions of damage for detection both spatially within the image and in terms of magnitude relative between regions within an image and relative between images. This may be a learned process where determined thresholds are a function of information such as anticipated damage type, lighting, time of day the picture was taken, or the sensor that recorded the images. Learning (or training) may be implemented by common machine learning algorithms, such as tensor flow, support vector machine, neural networks, autoencoders, Gaussian mixture models, or Naïve Bayes models, among others.

FIG. 11 is an exemplary damage intensity plane image 725 (visualization of the result of step 712) that may be based on pixel information of image 720 processed by step 711 and step 712 of method 710. In an example, after receiving an image, a computing device may do the following computing steps to create damage intensity plane image 725 from image 720: 1) extract hue, saturation, luminance (HSL)—Luminance plane; 2) Smoothing—Low Pass; 3) Convolution—Highlight details; 4) Edge detection—Sobel; and 5) add buffer. The aforementioned computing steps may have thresholds based on the anticipated damage type. As discussed herein, the steps may occur in different sequences or not occur based on information, such as anticipated damage type. FIG. 11 includes damage cluster 726, damage cluster 727, damage cluster 728, and damage cluster 729 that respectively correspond to the damage of home 721, home 722, home 723, and home 724.

At step 714, a damage intensity metric may be determined. With the damage intensity plane calculated at step 712, the damage intensity plane information associated with the region of interest (e.g., an insurance holder's property), may be extracted and a damage intensity metric may be determined. An operation such as an average, median, mode, maximum, minimum, or other more complex operation may be used on damage intensity plane associated values that are attributed to the selected area (e.g., member's property outlined 731 or subset within outline 731) to determine a damage intensity metric. The damage intensity metric may correspond to a level of damage to a structure. In an example, the damage intensity may be segmented into low, medium, high, and total loss. Low may be a damage intensity metric at or below 8, medium may between 8 and 15, high may between 15 and 20, and total loss may be anything above 20. Home 721 may be classified as low, home 722 may be classified as medium, home 723 may be classified as high, and home 724 may be classified as total loss. From this determination, the level of damage to a property (e.g., home 724 FIG. 10) may be estimated. The outlines, such as outline 731, in FIG. 10 indicate the area analyzed for damage. Home 721, home 722, home 723, and home 724 may be the only homes classified because they may be the only homes of interest in image 720 (e.g., members of a particular insurance company). The previous steps may be repeated for all images acquired or until all the properties of interest (e.g., properties of members) have been analyzed.

Figure 12:
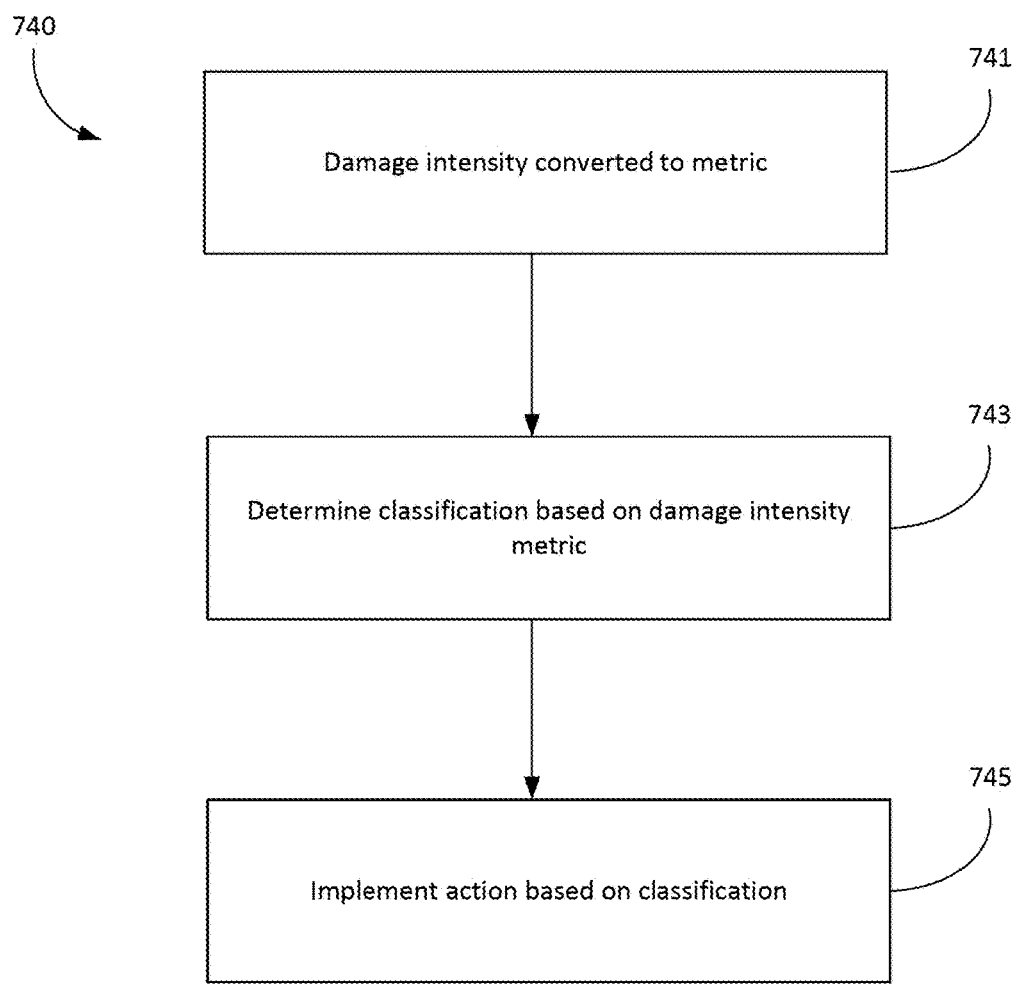
FIG. 12 illustrates an exemplary method associated with damage intensity.

FIG. 12 illustrates another exemplary method 740 associated with damage intensity. At step 741, damage intensity may be converted into a damage intensity metric for a property of interest. Subsequently, at step 743, the damage intensity metric may be classified based on reaching a threshold. Example classifications may be total loss, high, medium, or low. At step 745, based on the classification of the damage intensity metric, an action may be taken, such as the deployment of particular resources. Exemplary actions may be to provide instructions to reserve a nearby hotel room for a member, reserve a rental vehicle, ship a care package, deposit funds into a member's account, automatically approve an insurance claim associated with the damage, or send an unmanned vehicle to take multiple 2D pictures in order to create a 3D model that will assist in remotely assessing damage to the property, among other things. Other thing may involve the use of unmanned vehicle 100 as disclosed herein (e.g., mitigation, image capture, or delivering a service).

It is contemplated herein that analysis of a collection of pixels of image 720 that correspond to a property may be restricted to particular properties of interest (e.g., member of a particular insurance company). It is also contemplated that the methods, devices, and systems of FIG. 9 and FIG. 12 may make processes, such as an insurance claim process, more efficient. For example, if it is known that a first home out of a plurality of homes has a damage intensity metric that is equivalent to a "total loss," then the claim on that home may be granted immediately so that agent resources, or the like, may be directed to homes with more nuanced claims, such as homes with moderate to low damage.

Figure 13:
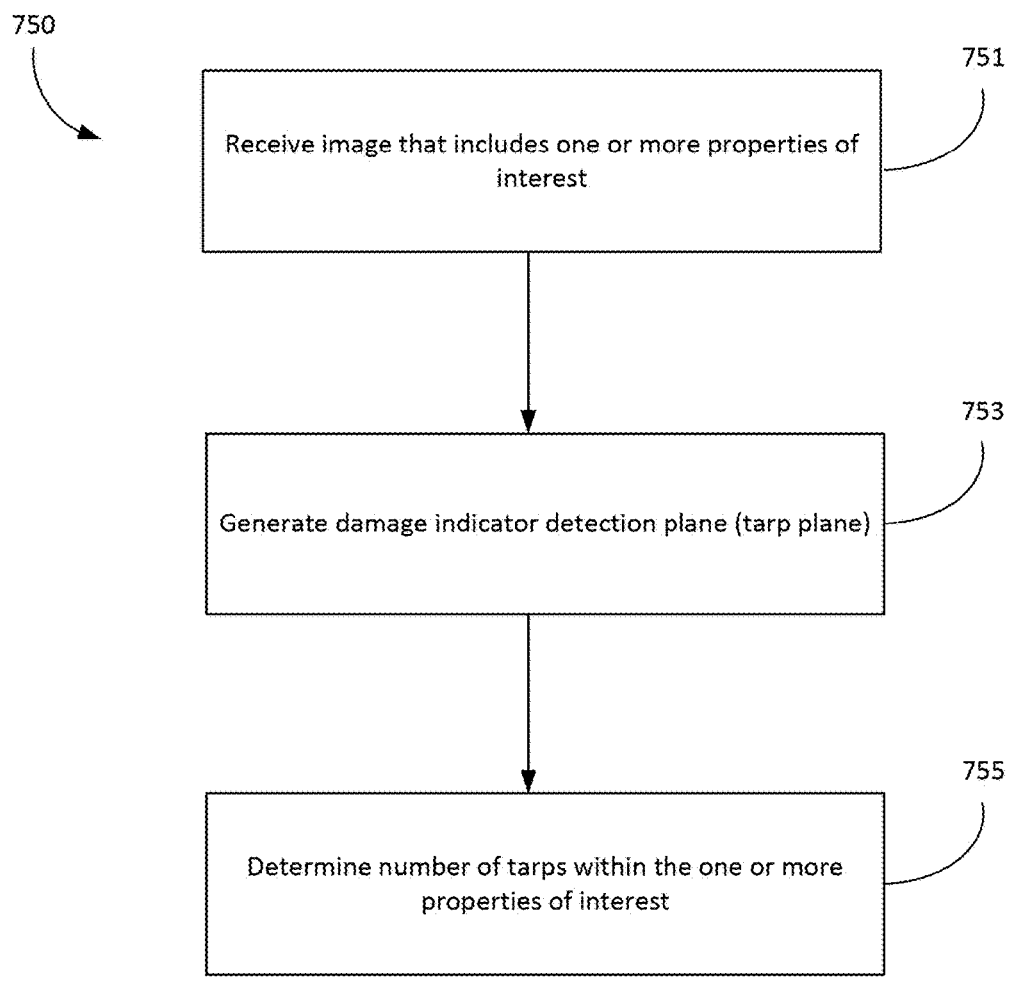
FIG. 13 illustrates an exemplary method for a damage or a tarp indicator detection process.
Figure 14:
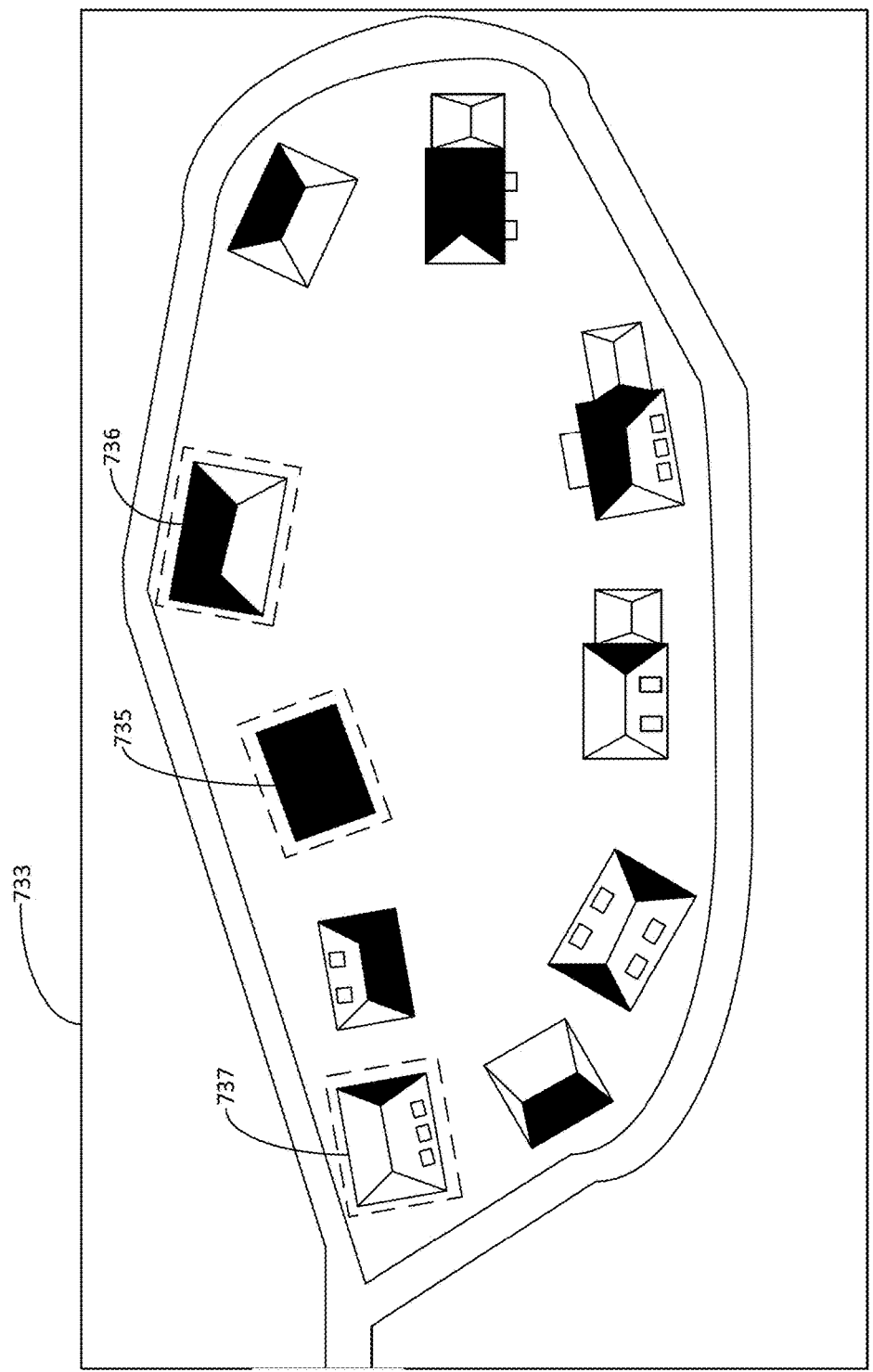
FIG. 14 illustrates an exemplary image of homes with tarps.
Figure 15:
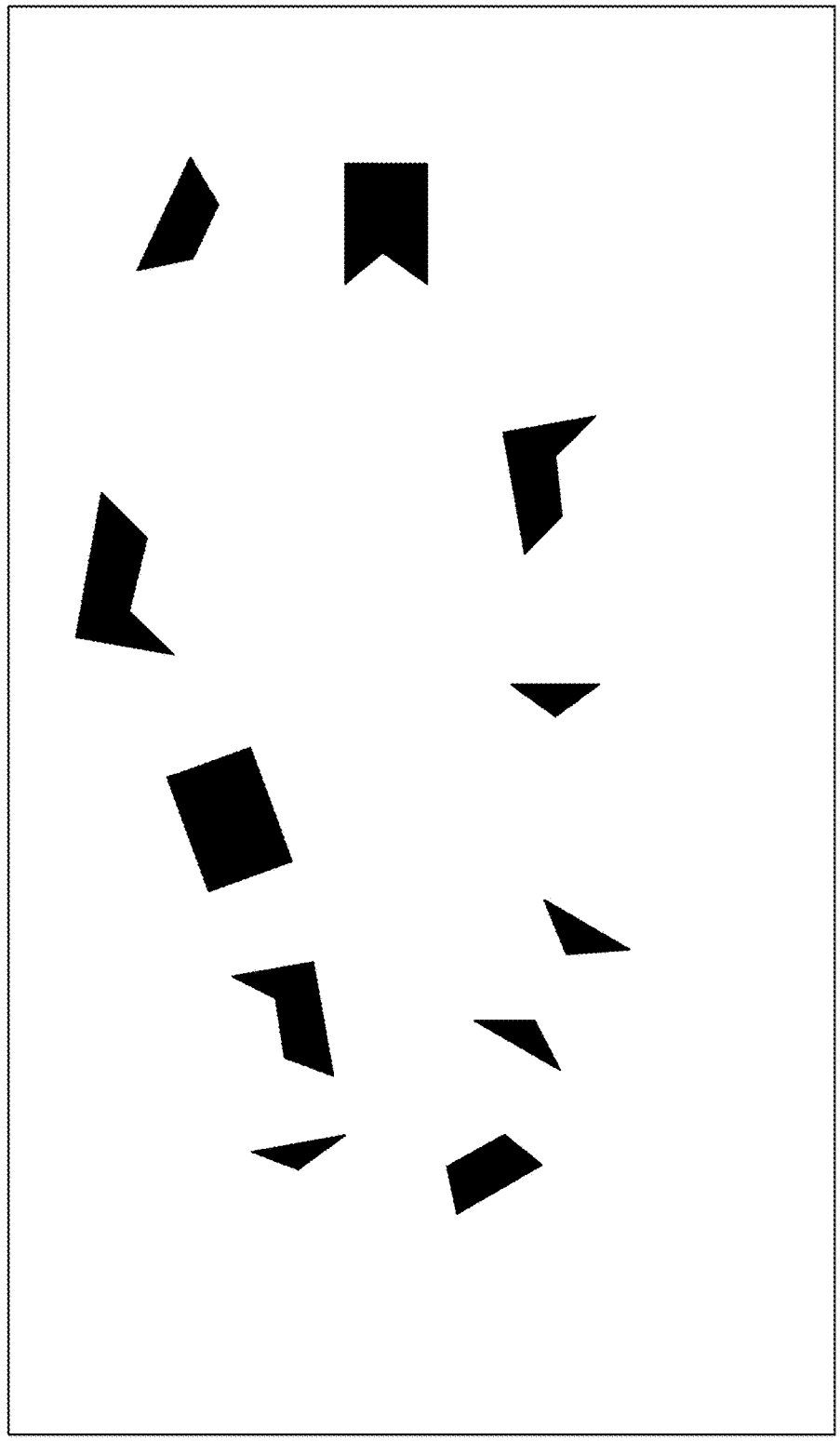
FIG. 15 illustrates an exemplary image of a tarp plane.

As discussed in more detail herein, there is the possibility that damage has occurred, but is actively being mitigated. An exemplary relevant indicator is a tarp placed on a roof. Detection of damage indicators may be used in conjunction with the damage intensity detection process to improve the accuracy and confidence in the remote sensing outputs. This process may detect the percentage of the roof that is covered with a tarp by calculating the roof area and the tarp area. This process can also calculate the percentage of exposed shingle substrate if not covered by a tarp. The process may be repeated for detecting other indicators that are anticipated to be on a home or other structure, which may include vapor barrier material and other types of material put on the roof to protect areas that have been damaged. FIG. 13 illustrates an exemplary method 750 for a damage or a tarp indicator detection process. At step 751, image 733 of FIG. 14 may be received. Image 733 includes one or more properties of interest (e.g., home 735, home 736, and home 737). Home 735 has a tarp that covers the entire roof, home 736 has a tarp that covers more than half the roof, and home 737 has a tarp that covers less than half the roof. At step 753, a damage indicator detection plane (e.g., tarp plane or vapor barrier plane) may be generated. FIG. 15 is an exemplary visualization of the tarp plane of step 753. The tarp plane of step 753 may generated based on a process that is similar to steps of FIG. 9. For example, here, pixel information of image 733 may be converted into the RGB space and then additionally converted into a hue, saturation, and luminance. The associated pixel information of image 733 may be processed with additional information to identify the corresponding pixels that have a RGB (or hue, saturation, and luminance) that is representative of a tarp and not a roof. The additional information for the process may include information that help associate with common tarp colors, such as blue, brown, or white.

Figure 16:
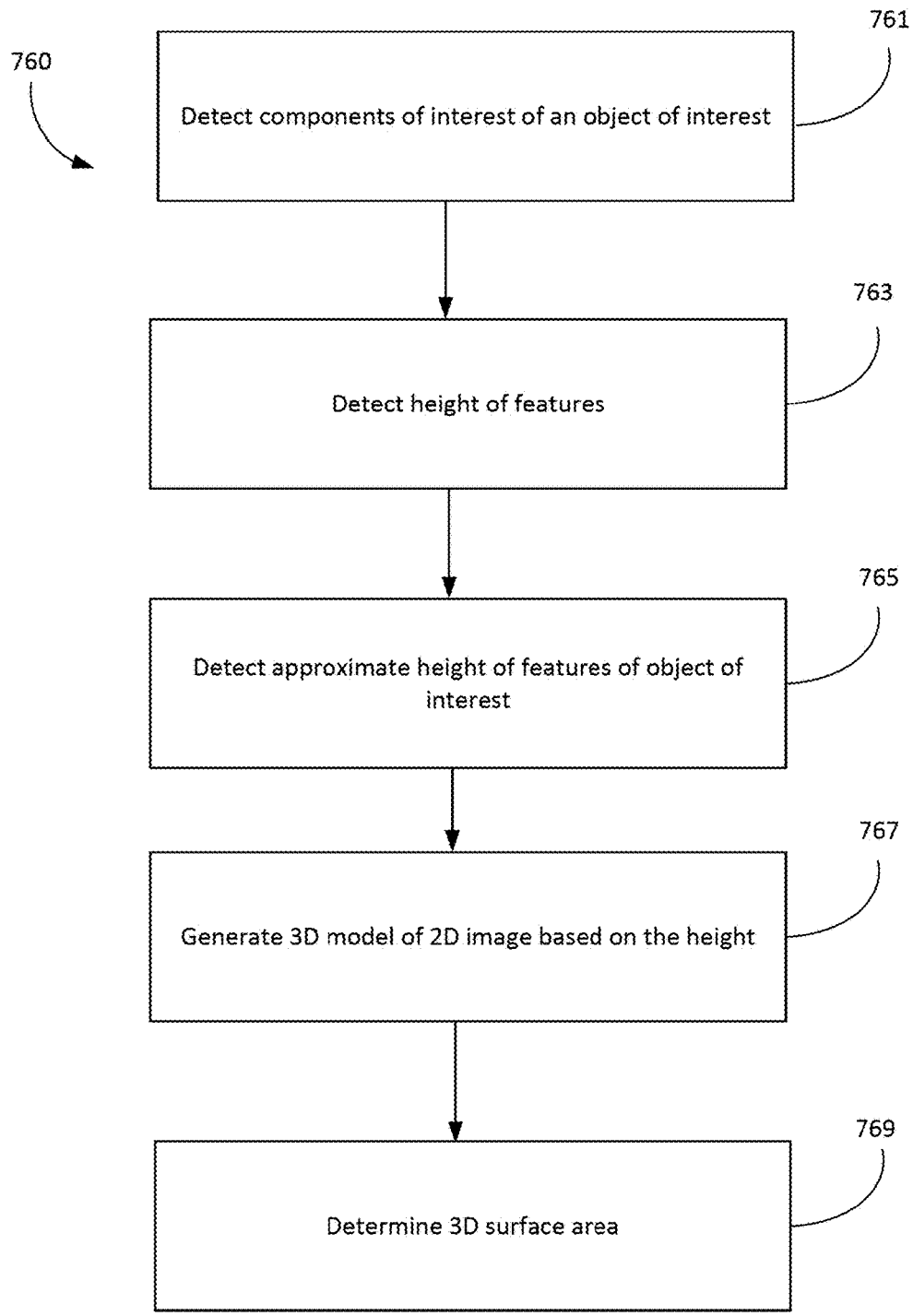
FIG. 16 illustrates an exemplary method for a damage measurement process.
Figure 17:
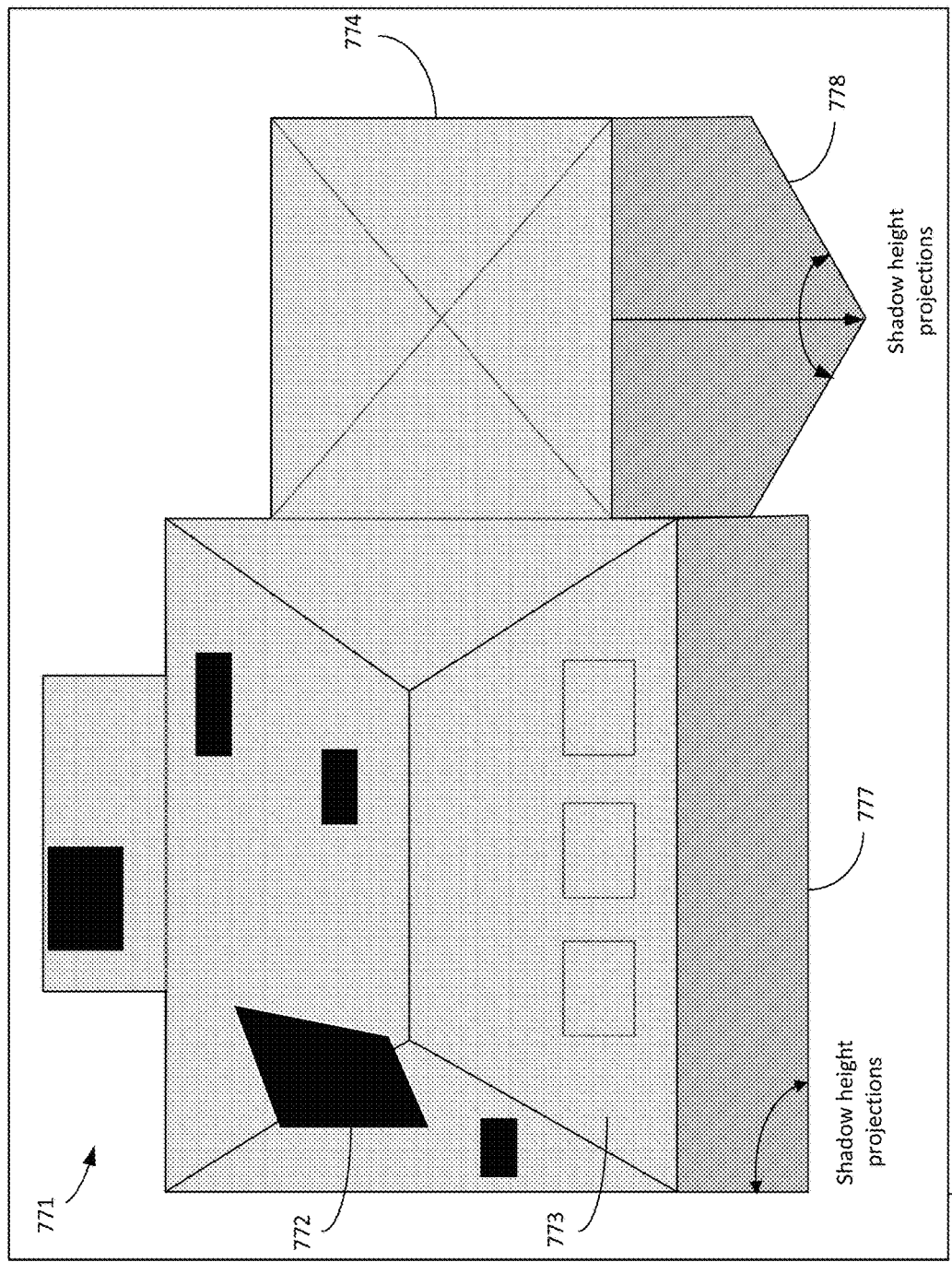
FIG. 17 illustrates an exemplary image of home.

Discussed below is a method for determining types and amounts of materials of a structure. Using the below method the roof material may be detected, the amount of exposed roof substrate may be detected, the amount of tarp on the roof may be detected, and the amount of exposed structural frame material may be detected, among other things. FIG. 16 illustrates an exemplary method 760 for a damage measurement process and FIG. 17 illustrates an exemplary image that may be used for the method of FIG. 17. At step 761, for a received image 770 of FIG. 17, components of interest, such as tarp 772 and other tarps are detected on an object of interest, such as house 771. The detection of tarp 772 may be based on the use of a trained material detection engine. The trained material detection engine may employ techniques as discussed with regard to method 750 of FIG. 13. The trained material detection engine may be trained to determine characteristics of an asphalt shingle roof when it has full sun exposure, when it is in the shade, there is a cloud, or if there is damage to the roof (e.g., method 750). At step 763, the height of features of house 771 may be determined. Features may include portions of roof 773 or roof 774. The height of roof 773 or roof 774 may be determined by different techniques, such as measuring a shadow that is cast by roof 773 or roof 774. In an example, the following may be known: the orientation of house 771 in image 770, the geographic location of house 771, and the date and time the picture (image 770) was taken. If the aforementioned are known, then the sun angle at the time the picture (image 770) may be determined and the characteristics of the shadow (shadow 777 and shadow 778) may be used to determine the height of roof 773 and roof 774. The edge of the shadows 777 and 778 may be identified and then the angle between shadow edges may be measured to provide an estimate of pitch for roofs 773 and 774. If the pitch of roof 773 or roof 774 is estimated, then the footprint may be used to get an estimate of the 3D square footage of roofs 773 and 774. If the shadows are not available in order to help accurately determine height, then an estimate of roof height may be extracted from common databases. The minimum, median, and maximum values of possible roof height may be used to calculate a confidence level of the accuracy of the 3D surface area of the material detected.

With continued reference to FIG. 16, at step 767, a 3D model of one or more 2D images of house 771 may be generated based on the determined height of step 765. At step 769, the 3D surface area may be determined. It is contemplated herein that 2D image 770 provides the footprint of the house, but attempting to derive the area of roof 773 or roof 774 based on the footprint would provide inaccurate results. Determining the area based on 3D information may provide a better estimate of actual square footage of roof 773 or roof 774.

For additional context, with certain activities, such as the adjustment process for insurance, it is helpful to know the amount of material needed and the surface area of damage to an object (e.g., roof). The methods, systems, and devices herein may allow quick determination of the amount of material needed for a home or to quickly order, determine level of claims exposer for a region, task contractors, or reserve material, among other things. For example, in a situation where tornados cause damage, there will likely be a need to obtain building materials. The systems herein allow for automatic reservation of material contractor resources based on the defined area or indication of damage intensity, among other things, in order to execute the rebuilding process. The methods herein may estimate the amount of damage without prior knowledge of the state or dimensions of a structure. The damage determination discussed herein may be used to determine the magnitude of claims exposure in a geographic area (e.g., subdivision, city, county, etc.). It is contemplated that the methods herein may be appropriately combined, such as the method of FIG. 13 and the method of FIG. 17.

Figure 18:
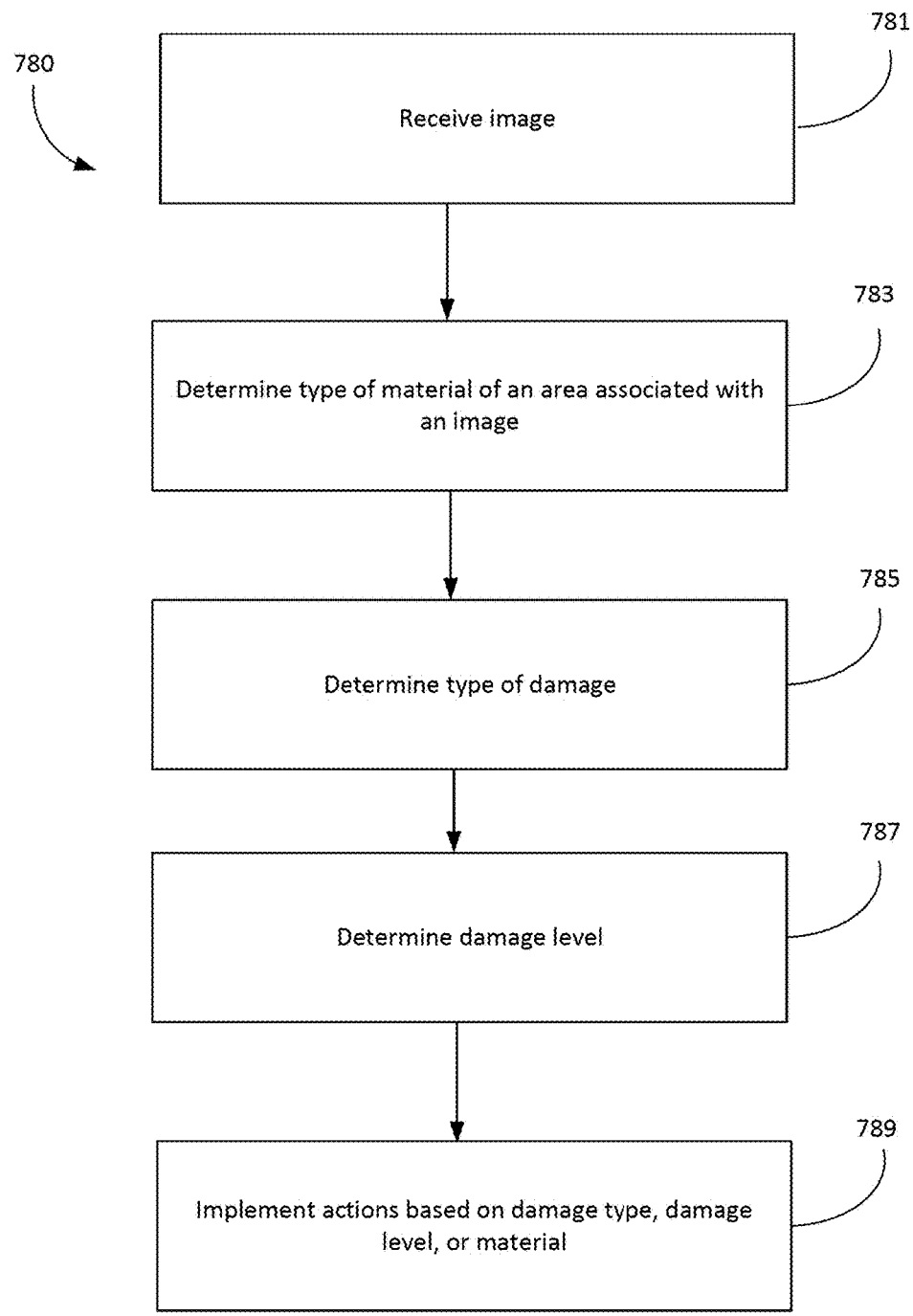
FIG. 18 illustrates an exemplary method for decision engine.

FIG. 18 illustrates an exemplary method 780 that may use one or more of the method, systems, and devices discussed herein in order to determine whether or how to respond to type of damage, intensity of damage, or determined material. At step 781, an image may be received. The image may be converted into a 3D model based on 2D images to assist in determining surface area of a part of the structure, such as roof 773. At step 783, type of material of the area (e.g., roof 773) is determined. Determining the type of material of the area may be based on several different considerations. In a first consideration, if the address of the structure is known and the area of the structure is known, then a database may already contain the type of material for that part of the structure. For example, there may be a database for the roof type for that address or common roof types for a region. In a second consideration, if the part of the structure (e.g., whether roof or outside wall of a home) is known, image processing (e.g., hue, saturation, luminance) may be used to help detect the most likely material the part of the structure is made of. For example, image processing techniques to help determine the type of material may be associated with one or more of the following techniques: filtering, edge detection (e.g. sobel operator, prewitt operator), image hue, saturation, intensity, color, etc. thresholding, or binary image morphology. Image processing techniques to help determine material include information associated with trained machine learning engines, image classification algorithms, multi class classification, and anomaly detection. The aforementioned techniques may be used to correlate types of material when a threshold is reached. Filtering and transform operators may enhance the image features indicative of type of material. This may be a learned process where determined thresholds are a function of information such as lighting, time of day the picture was taken, or the sensor that recorded the images. Learning (or training) may be implemented by common machine learning algorithms, such as tensor flow, support vector machine, neural networks, autoencoders, Gaussian mixture models, or Naïve Bayes models, among others. At step 785, the type of damage may be determined. This may be based on the determination of the part of the structure damaged, image processing as discussed herein, or weather, among other things as discussed herein. At step 787, damage level may be determined. The damage level may be determined by image processing as discussed herein (e.g., step 712). In an example, a computing device may count the number of hail strikes on each section of roof based on criteria for a hail strike classification. The count may assist in determining the level of damage and be used to determine what actions should be implemented in step 789. At step 789, actions are implemented based on damage type, damage level, or material. In one example, the determined damage may be automatically overlayed via a computer onto a digital 3D model of a structure (e.g., house 771). Other actions may include a computing device sending messages to other computing devices to order appropriate material for repair of the structure, reserve services (e.g., roofing service, yard service, auto body service), submitting insurance claims, dispatch resources, create a damage report for the structure, create a damage report for structures in a region, or the like.

Methods and systems discussed herein may be conducted by a single UAV, a fleet of UAVs, or a combination of terrestrial and aerial components. In an example, a plurality of UAVs (or other apparatuses) may be used to capture images of a property.

The present disclosure is directed to methods, systems, and devices that may be associated with unmanned vehicles. The present disclosure is not limited in any way to the examples, which can be applicable in various forms, as appreciated by one skilled in the art. Therefore, it is to be understood that any terms, phrases, structural and functional details, disclosed herein are merely a basis for the claims and as a representative for teaching one skilled in the art to variously employ the present disclosure.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth.

One skilled in the art will appreciate further features and advantages based on the described examples. Accordingly, the disclosure is not to be limited by what has been particularly shown and described, except as indicated by the appended claims. Further, although at least one series of steps are presented as an exemplary method of practicing one or more examples described herein, it will be appreciated by those skilled in the art that the steps identified may be practiced in any order that is practicable, including without limitation the omission of one or more steps.

It is to be appreciated that network 50 depicted in FIG. 1, for example, may include a local area network (LAN), a wide area network (WAN), a personal area network (PAN), or combinations thereof. Such networking environments are commonplace in offices, enterprise-wide computer networks, intranets, and the Internet. For instance, when used in a LAN networking environment, system 90 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to system 90, or portions thereof, may be stored in a remote memory storage device such as storage medium. Computing devices may communicate over network 50 through one or more communications links 75 formed between data interfaces. Communication links 75 may comprise either wired or wireless links. It is to be appreciated that the illustrated network connections in the figures (e.g., FIG. 1 or FIG. 19) are exemplary and other ways of establishing a communications link between multiple devices may be used.

FIG. 19 and the following discussion are intended to provide a brief general description of a suitable computing environment in which the methods and systems disclosed herein or portions thereof may be implemented. Although not required, the methods and systems disclosed herein is described in the general context of computer-executable instructions, such as program modules, being executed by a computer, such as a client workstation, server, personal computer, or mobile computing device such as a smartphone. Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, network PCs, minicomputers, mainframe computers and the like. A processor may be implemented on a single-chip, multiple chips or multiple electrical components with different architectures. The methods and systems disclosed herein may also be practiced in distributed computing environments where tasks are performed by remote processing devices that are linked through a communications network. In a distributed computing environment, program modules may be located in both local and remote memory storage devices.

FIG. 19 is a block diagram representing a general purpose computer system in which aspects of the methods and systems disclosed herein and/or portions thereof may be incorporated. As shown, the exemplary general purpose computing system includes a computer 920 or the like, including a processing unit 921, a system memory 922, and a system bus 923 that couples various system components including the system memory to the processing unit 921. The system bus 923 may be any of several types of bus structures including a memory bus or memory controller, a peripheral bus, and a local bus using any of a variety of bus architectures. The system memory includes read-only memory (ROM) 924 and random access memory (RAM) 925. A basic input/output system 926 (BIOS), containing the basic routines that help to transfer information between elements within the computer 920, such as during start-up, is stored in ROM 924.

The computer 920 may further include a hard disk drive 927 for reading from and writing to a hard disk (not shown), a magnetic disk drive 928 for reading from or writing to a removable magnetic disk 929, and an optical disk drive 930 for reading from or writing to a removable optical disk 931 such as a CD-ROM or other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide non-volatile storage of computer readable instructions, data structures, program modules and other data for the computer 920. As described herein, computer-readable media is a tangible, physical, and concrete article of manufacture and thus not a signal per se.

Although the exemplary environment described herein employs a hard disk, a removable magnetic disk 929, and a removable optical disk 931, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 929, optical disk 931, ROM 924 or RAM 925, including an operating system 935, one or more application programs 936, other program modules 937 and program data 938. A user may enter commands and information into the computer 920 through input devices such as a keyboard 940 and pointing device 942. Other input devices (not shown) may include a microphone, joystick, game pad, satellite disk, scanner, or the like. These and other input devices are often connected to the processing unit 921 through a serial port interface 946 that is coupled to the system bus, but may be connected by other interfaces, such as a parallel port, game port, or universal serial bus (USB). A monitor 947 or other type of display device is also connected to the system bus 923 via an interface, such as a video adapter 948. In addition to the monitor 947, a computer may include other peripheral output devices (not shown), such as speakers and printers. The monitor 947 may display information discussed herein with regard to the methods and systems associated with FIG. 1-FIG. 17. For example, magnitude of claims exposure in a geographic area, damage intensity metric, or image of damage intensity plane. The exemplary system of FIG. 19 also includes a host adapter 955, a Small Computer System Interface (SCSI) bus 956, and an external storage device 962 connected to the SCSI bus 956.

The computer 920 may operate in a networked environment using logical connections to one or more remote computers, such as a remote computer 949. The remote computer 949 may be a personal computer, a server, a router, a network PC, a peer device or other common network node, and may include many or all of the elements described above relative to the computer 920, although only a memory storage device 950 has been illustrated in FIG. 19. The logical connections depicted in FIG. 19 include a local area network (LAN) 951 and a wide area network (WAN) 952. Such networking environments are commonplace in offices, enterprise-wide computer networks, intranets, and the Internet.

When used in a LAN networking environment, the computer 920 is connected to the LAN 951 through a network interface or adapter 953. When used in a WAN networking environment, the computer 920 may include a modem 954 or other means for establishing communications over the wide area network 952, such as the Internet. The modem 954, which may be internal or external, is connected to the system bus 923 via the serial port interface 946. In a networked environment, program modules depicted relative to the computer 920, or portions thereof, may be stored in the remote memory storage device. It will be appreciated that the network connections shown are exemplary and other means of establishing a communications link between the computers may be used.

Computer 920 may include a variety of computer readable storage media. Computer readable storage media can be any available media that can be accessed by computer 920 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 920. Combinations of any of the above should also be included within the scope of computer readable media that may be used to store source code for implementing the methods and systems described herein. Any combination of the features or elements disclosed herein may be used in one or more examples.

In describing preferred examples of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A device comprising:
   a processor; and
   a memory coupled with the processor, the memory having stored thereon executable instructions that when executed by the processor to cause the processor to effectuate operations comprising:
   receiving an image of at least one structure;
   generating a damage intensity plane of the image based on analysis of pixels in the image;
   based on the damage intensity plane, generating a damage intensity metric for at least a portion of the at least one structure by averaging pixel information, and
   based on the damage intensity metric, determining damage to the at least one structure.

2. The device of claim 1, wherein the at least one structure is a house.

3. The device of claim 1, wherein the image is an aerial perspective of the at least one structure.

4. The device of claim 1, wherein the generating the damage intensity plane is based on an edge detection technique.

5. The device of claim 1, wherein the at least the portion of the at least one structure is a roof of a house.

6. The device of claim 1, wherein the generating the damage intensity plane is based on a hue, saturation, and luminance technique.

7. The device of claim 1, further comprising providing instructions to a camera of an unmanned vehicle to take a picture of the at least one structure based on the damage intensity metric reaching a threshold.

8. A method comprising:
   receiving, by a computing device, an image of at least one structure;
   generating a damage intensity plane of the image based on analysis of pixels in the image;
   based on the damage intensity plane, generating a damage intensity metric for at least a portion of the at least one structure by averaging pixel information;
   based on the damage intensity metric, determining damage to the at least one structure; and
   based on the determining damage to the at least one structure, determining a repair to perform to the at least one structure.

9. The method of claim 8, wherein the at least one structure is a house.

10. The method of claim 8, wherein the at least the portion of the at least one structure is a roof of a house.

11. The method of claim 8, wherein the image is an aerial perspective of the at least one structure.

12. The method of claim 8, wherein the generating the damage intensity plane is based on an edge detection technique.

13. The method of claim 8, wherein the generating the damage intensity plane is based on a hue, saturation, and luminance technique.

14. The method of claim 8, further comprising providing instructions to a camera of an unmanned vehicle to take a picture of the at least one structure based on the damage intensity metric reaching a threshold.

15. A system comprising:
   a sensor;
   an unmanned vehicle connected with the sensor; and
   a device communicatively connected with the sensor or the unmanned vehicle, the device comprising;
   a processor; and
   a memory coupled with the processor, the memory having stored thereon executable instructions that when executed by the processor to cause the processor to effectuate operations comprising:
   receiving an image of at least one structure;
   generating a damage intensity plane of the image based on analysis of pixels in the image;
   based on the damage intensity plane, generating a damage intensity metric for at least a portion of the at least one structure by averaging pixel information;
   based on the damage intensity metric, determining damage to the at least one structure; and
   sending, to a computing device, an indication of the damage to the at least one structure.

16. The system of claim 15, wherein the at least one structure is a house.

17. The system of claim 15, wherein the image is an aerial perspective of the at least one structure.

18. The system of claim 15, wherein the generating the damage intensity plane is based on an edge detection technique.

19. The system of claim 15, wherein the generating the damage intensity plane is based on a hue, saturation, and luminance technique.

20. The system of claim 15, further comprising providing instructions to a camera of an unmanned vehicle to take a picture of the at least one structure based on the damage intensity metric reaching a threshold.

* * * * *